United States Patent
Safon et al.

(10) Patent No.: US 12,180,094 B2
(45) Date of Patent: Dec. 31, 2024

(54) POOL FILTRATION SYSTEM AND METHOD

(71) Applicant: Pentair Water Pool & Spa, Inc., Cary, NC (US)

(72) Inventors: Thomas Johnson Ray Safon, Holly Springs, NC (US); Eric Pinnell, Cary, NC (US); Sean McEwan, Cary, NC (US)

(73) Assignee: Pentair Water Pool & Spa, Inc., Cary, NC (US)

( * ) Notice: Subject to any disclaimer, the term of this patent is extended or adjusted under 35 U.S.C. 154(b) by 0 days.

(21) Appl. No.: 17/650,598

(22) Filed: Feb. 10, 2022

(65) Prior Publication Data
US 2022/0250952 A1 Aug. 11, 2022

Related U.S. Application Data

(60) Provisional application No. 63/200,025, filed on Feb. 10, 2021.

(51) Int. Cl.
*C02F 1/44* (2023.01)
*C02F 1/00* (2023.01)
(Continued)

(52) U.S. Cl.
CPC ............... *C02F 1/444* (2013.01); *C02F 1/001* (2013.01); *C02F 2103/42* (2013.01);
(Continued)

(58) Field of Classification Search
CPC ...... C02F 1/444; C02F 1/001; C02F 2103/42; C02F 2201/005; C02F 2301/043; C02F 2209/006; C02F 2209/03; E04H 4/1209
(Continued)

(56) References Cited

U.S. PATENT DOCUMENTS

| 3,954,621 A | 5/1976 | Etani et al. |
| 4,134,836 A | 1/1979 | Rowley et al. |

(Continued)

FOREIGN PATENT DOCUMENTS

| JP | H03238083 A | 10/1991 |
| WO | 99/33752 A1 | 7/1999 |

(Continued)

OTHER PUBLICATIONS

Kingsbury, Encyclopedia of Membranes, pp. 123-124, 2016 (Year: 2016).*

(Continued)

*Primary Examiner* — Fred Prince
(74) *Attorney, Agent, or Firm* — Husch Blackwell LLP

(57) ABSTRACT

Some embodiments provide a pool filtration system for filtering pool water including a pump, a primary filter in fluid communication with the pump, and an auxiliary filter in fluid communication with the pump and the primary filter. The auxiliary filter can include a membrane filtration module, and a flow distribution manifold. The flow distribution manifold can include an influent port in fluid communication with an influent flow opening and an effluent port in fluid communication with an effluent flow opening. The influent flow opening and the effluent flow opening can be fluidly coupled across the membrane filtration module. The flow distribution manifold can further include a bypass mechanism. The bypass mechanism can include at least one valve that selectively fluidly couples the influent port to the effluent port to bypass the membrane filtration module.

20 Claims, 18 Drawing Sheets

(51) Int. Cl.
  *E04H 4/12* (2006.01)
  *C02F 103/42* (2006.01)
(52) U.S. Cl.
  CPC .. *C02F 2201/005* (2013.01); *C02F 2209/006* (2013.01); *C02F 2209/03* (2013.01); *C02F 2301/043* (2013.01); *E04H 4/1209* (2013.01)
(58) Field of Classification Search
  USPC .............. 210/167.1, 167.12, 167.13, 167.14, 210/500.21
  See application file for complete search history.

(56) References Cited

U.S. PATENT DOCUMENTS

| | | | |
|---|---|---|---|
| 4,546,787 A * | 10/1985 | Meyers | F16K 31/54 |
| | | | 251/249 |
| 4,592,841 A | 6/1986 | Ancelle et al. | |
| 4,622,137 A * | 11/1986 | Kessler | B01D 29/15 |
| | | | 210/167.13 |
| 4,657,673 A * | 4/1987 | Kessler | B01D 24/14 |
| | | | 210/167.13 |
| 5,234,583 A | 8/1993 | Cluff | |
| 5,244,585 A | 9/1993 | Sugimoto | |
| 5,536,403 A | 7/1996 | Sugimoto | |
| 5,584,990 A | 12/1996 | Sugimoto | |
| 5,584,992 A | 12/1996 | Sugimoto | |
| 5,632,890 A | 5/1997 | Sugimoto | |
| 6,056,873 A * | 5/2000 | Hartley | C02F 1/003 |
| | | | 210/278 |
| 6,451,209 B1 | 9/2002 | Kaas | |
| 9,758,388 B2 | 9/2017 | Lass | |
| 10,145,136 B2 | 12/2018 | Saccoccio et al. | |
| 10,563,415 B2 | 2/2020 | Saccoccio et al. | |
| 2006/0124527 A1 | 6/2006 | Goodwin et al. | |
| 2007/0181498 A1 | 8/2007 | Kaas | |
| 2011/0219531 A1 * | 9/2011 | Walsh | E04H 4/169 |
| | | | 4/507 |
| 2013/0334113 A1 * | 12/2013 | Erlich | E04H 4/1263 |
| | | | 210/167.1 |
| 2014/0102966 A1 | 4/2014 | Harder | |
| 2015/0020306 A1 * | 1/2015 | Lin | A61H 33/0087 |
| | | | 4/585 |
| 2015/0114915 A1 * | 4/2015 | Marciano | B01D 35/02 |
| | | | 210/788 |
| 2017/0369336 A1 | 12/2017 | Lass | |
| 2018/0021734 A1 | 1/2018 | Eder et al. | |
| 2020/0038812 A1 | 2/2020 | Negrin et al. | |
| 2021/0061688 A1 | 3/2021 | Fukase et al. | |

FOREIGN PATENT DOCUMENTS

| | | |
|---|---|---|
| WO | 03/076346 A2 | 9/2003 |
| WO | 2005/108313 A1 | 11/2005 |
| WO | 2010143184 A1 | 12/2010 |
| WO | 2016/100998 A1 | 6/2016 |
| WO | 2016/162097 A1 | 10/2016 |
| WO | 2018/065979 A1 | 4/2018 |

OTHER PUBLICATIONS

Doheny, De Filters, pp. 1-3, 2018 (Year: 2018).*
Extended European Search Report issued for European Patent Application No. 22156159.0 dated Jun. 3, 2022, 7 pages.
Communication pursuant to Article 94(3) EPC issued for corresponding European Patent Application No. 22156159.0, dated Feb. 5, 2024, 5 Pages.
Annonymous, "Membrane", Wikipedia, Dec. 11, 2020, XP093125254, retrieved on Jan. 30, 2024, Available at: https://en.wikipedia.org/w/index/php?title=Membrane&oldid=993513243, 6 pages.
Communication pursuant to Article 94(3) EPC issued for corresponding European Patent Application No. 22197375.3, dated Mar. 7, 2024, 7 pages.
Extended European Search Report issued for corresponding European Patent Application No. 22197375.3, dated Jan. 12, 2023, 7 pages.
Communication pursuant to Article 94(3) EPC for corresponding European Application No. 22156159.1, dated Sep. 16, 2024, 5 pages.

* cited by examiner

FIG. 18

POOL FILTRATION SYSTEM AND METHOD

RELATED APPLICATIONS

This application claims priority under 35 U.S.C. § 119 to U.S. Provisional Patent Application No. 63/200,025, filed Feb. 10, 2021 entitled "POOL FILTRATION SYSTEM AND METHOD", the entire contents of which are incorporated herein by reference all purposes.

BACKGROUND

Filtration systems are an important aspect of maintaining water clarity and quality, in addition to ensuring healthy conditions in swimming pools, hot tubs, plunge pools, and other recreational water venues. In attempts to clean the existing water in a pool, pool maintenance personnel typically attempt to filter, process, and return the water to the pool. Filtration systems are used to remove pollutants and contaminants to reduce turbidity and to promote visual clarity of the water. Contaminants are often introduced into pools by environmental sources such as windblown debris, external unsanitary water sources, and droppings from animals that contain potentially harmful pathogens. Other contaminants are introduced from the swimmers and can include sweat, bodily oils, suntan lotion, urine, and other matter. In addition to contributing to high turbidity, contaminants can also react with disinfectant chemicals to produce chloramines and other disinfection by-products, which can contribute to adverse health effects.

Traditional pool and spa filtration technologies used in the art include diatomaceous earth filters, pressure-fed sand filters, gravity sand filters, and cartridge filters. However, these filtration technologies have inherent shortcomings, including the inability to capture small, suspended solids, bacteria, and viruses.

SUMMARY

Some embodiments provide a pool filtration system for filtering pool water including a pump, a primary filter in fluid communication with the pump, and an auxiliary filter in fluid communication with the pump and the primary filter. The auxiliary filter can include a membrane filtration module, and a flow distribution manifold. The flow distribution manifold can include an influent port in fluid communication with an influent flow opening and an effluent port in fluid communication with an effluent flow opening. The influent flow opening and the effluent flow opening can be fluidly coupled across the membrane filtration module. The flow distribution manifold can further include a bypass mechanism. The bypass mechanism can include at least one valve that selectively fluidly couples the influent port to the effluent port to bypass the membrane filtration module.

Some embodiments provide a pool filtration system for filtering pool water including a pump and an auxiliary filter in fluid communication with the pump. The auxiliary filter can include a membrane filtration module and a flow distribution manifold including an influent port and an effluent port. The membrane filtration module can fluidly couple the influent port and the effluent port along a first flow path. The flow distribution manifold can further include a bypass mechanism including a first valve and a second valve that each selectively fluidly couple the influent port and the effluent port along a second flow path.

Some embodiments provide a pool filtration system for filtering pool water including a pump, a primary filter in fluid communication with the pump, and an auxiliary filter in fluid communication with the pump and the primary filter. The auxiliary filter can include a membrane filtration module, a flow distribution manifold, and a vertical valve manifold. The flow distribution manifold can include an influent port fluidly coupled to a first end of the membrane filtration module, an effluent port fluidly coupled to a second end of the membrane filtration module, and a bypass mechanism including at least one valve that selectively fluidly couples the influent port and the effluent port. The vertical valve manifold can include an influent opening, an effluent opening, a drain pipe, a first branch port fluidly coupled to the effluent port of the flow distribution manifold, and a second branch port fluidly coupled to the influent port of the flow distribution manifold. The vertical valve manifold can include a shaft with plurality of disks, the shaft being movable between a first position and a second position.

DESCRIPTION OF THE DRAWINGS

FIG. 18 is a partial isometric view of the auxiliary filter of FIG. 10 with some parts rendered transparently and arrows indicating the flow of water a second, backwash mode.

DETAILED DESCRIPTION

Figure 1:
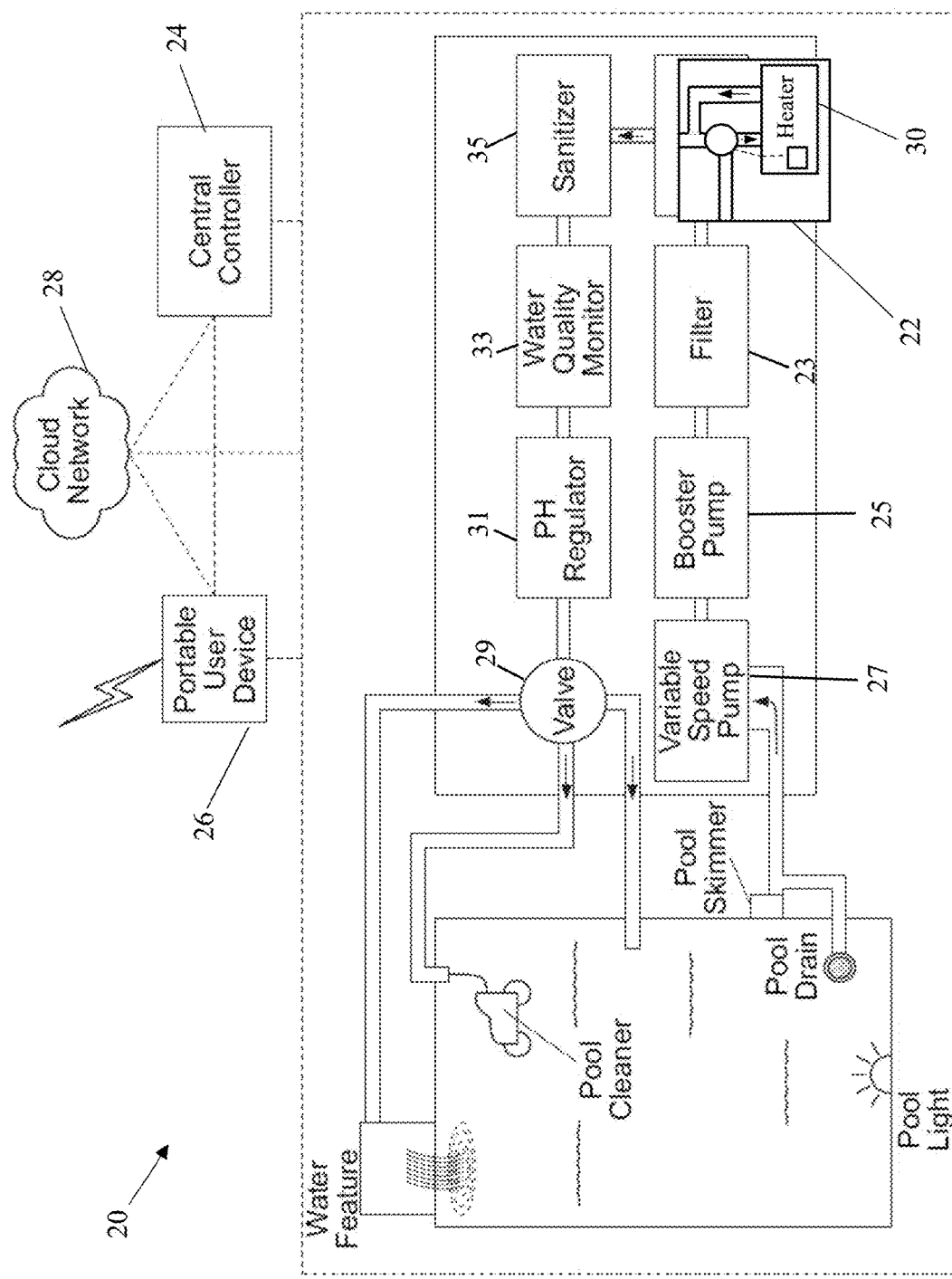
FIG. 1 is a schematic diagram depicting a conventional swimming pool and a pool pad with one or more components.

Before any embodiments are described in detail, it is to be understood that the disclosure is not limited in its application to the details of construction and the arrangement of components set forth in the following description or illustrated in the following drawings, which is limited only by the claims that follow the present disclosure. The disclosure is capable of other embodiments, and of being practiced, or of being carried out, in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following description is presented to enable a person skilled in the art to make and use embodiments of the disclosure. Various modifications to the illustrated embodiments will be readily apparent to those skilled in the art, and the generic principles herein can be applied to other embodiments and applications without departing from embodiments of the disclosure. Thus, embodiments of the disclosure are not intended to be limited to embodiments shown but are to be accorded the widest scope consistent with the principles and features disclosed herein. The following detailed description is to be read with reference to the figures, in which like elements in different figures have like reference numerals. Skilled artisans will recognize the examples provided herein have many useful alternatives and fall within the scope of embodiments of the disclosure.

Additionally, while the following discussion may describe features associated with specific devices, it is understood that additional devices and or features can be used with the described systems and methods, and that the discussed devices and features are used to provide examples of possible embodiments, without being limited.

Traditional pool filtration for aquatic applications such as pools (e.g., swimming pools, spas, etc.) is generally accomplished through one of three primary approaches. The first approach uses a sand filter which consists of a fine sand particle bed through which water is pushed to remove particulate. Once the pressure drop exceeds a certain limit, flow is temporarily reversed (backwashing) and routed to the drain. The particulate is purged from the sand bed through this process and disposed of so that filtration can then resume normally. This approach makes it difficult to filter out fine particles (usually operates in the 10-25 µm range) and requires a high-pressure vessel. Further, backwashing discharges chlorinated wastewater into the water system.

The second approach is to substitute the sand with diatomaceous earth (DE) in a filter vessel. This allows the capture of particles smaller than sand (down to around three microns), but this approach requires a high-pressure vessel and backwashing discharges chlorinated wastewater into the water system.

The third option is to use a cartridge filter which consists of a pleated, non-woven filter element. When the pressure drop reaches a predetermined threshold, the filter elements are usually rinsed with tap water to be cleaned, which prevents chlorinated water from being introduced to the sewers. The filter elements generally capture particles sized around the 10-20 micron range and thus do not filter out the smaller particles required to achieve high pool clarity. Denser non-woven filter elements can be constructed, but may require more frequent cleanings. The filter elements also require a high-pressure vessel for operation and produce a higher pressure drop. The higher pressure drop requires more pumping power and thus increases electrical demand and cost.

The present disclosure is provided as a side-stream, auxiliary filtration device. A side-stream auxiliary filter can be, for example, a high efficiency single-pass device, which substantially continuously filters a portion of the pool system water flow. Through consecutive dilution, auxiliary filters can achieve equal or greater steady-state efficiencies to those of lower efficiency single-pass full stream devices. For example, a traditional full-stream filter media's single pass efficiency will decrease with each turnover as the particle distribution of the fluid body shifts due to the media's inability to filter smaller particles. A high efficiency side-stream auxiliary filter media maintains constant efficiency with each turnover. Additionally, when operated at less than 100%, a side-stream auxiliary filter can achieve equal or greater efficiency than those of full stream devices.

The side-stream auxiliary filtration device provides improved small particulate removal through membrane filter media. Hydraulic filtration media is conventionally employed with a defined maximum volumetric flow rate per effective unit area, hereby denoted as "flux". Differing media types have flux rates corresponding to their construction and filtering method. Utilizing a flux rate definition has a normalizing effect and permits scalability of a given media to suit a distinct volumetric flow rate. It is generally known that hollow-fiber membrane filtration has a defined range of flux rates which can practically be employed, and that backwash recovery is improved when a backwash flux exceeding that used during filtration is utilized. Traditional membrane filters employed as full-stream devices have inherent limitations for flux rate, requiring comparatively large filtration areas and/or cross-flow filtration. The side-stream auxiliary filtration device requires less membrane filtration area and less hydraulic restriction than full-stream membrane filters.

The side-stream auxiliary filtration device is designed to operate as a filtration device within a pool or spa system to supplement and/or entirely replace a main filter, such as traditional sand, cartridge, or diatomaceous earth filters. Traditional pool and spa filters are generally capable of capturing particles between about 3 to about the 30 micron range. Membrane filtration is capable of capturing particles in the range of about 0.02 to about 0.20 microns. It is this differentiation for which the current disclosure provides unique benefits for a pool and spa application by adding capability to capture small, suspended solids, such as skin cells, pollen, algae spores, and microorganisms, such as bacteria and viruses, when present in the body of water. Microorganisms are generally known to be leading cause of spread of recreational water illnesses, including cryptosporidiosis. Additional benefits of the membrane filter size-exclusion beyond traditional pool and spa filters include improved water clarity, decreased disinfection byproduct formation, decreased demand for primary recreational water sanitizer and balancer along with more consistent sanitizer and balancer levels.

FIG. 1 illustrates an exemplary aquatic application, such as a pool or spa system 20, according to disclosed embodiments. As seen in FIG. 1, the pool or spa system 20 can include a heating system 22 configured to heat water for the pool and/or a spa to a set temperature. One or more additional components may be optionally included in the pool or spa system 20, including, for example, a filter 23, a booster pump 25, a variable speed pump 27, one or more sensors and/or valves 29, a pH and/or water chemistry regulation mechanism 31, a water quality monitor 33, a sanitizer 35, and various communication enabling devices, described in more detail below. One or more of the components are provided in fluid communication with each other and the pool to form a fluid circuit. The fluid circuit facilitates water movement from the pool or spa through one or more of the pool components and the fluid circuit to accomplish various tasks including, for example, pumping, cleaning, heating, sanitizing, and the like.

Still referring to FIG. 1, the system 20 further includes a central controller 24, and a portable user device 26 that can interface with the central controller 24, either directly over a local area network, or via a cloud network 28. Although FIG. 1 depicts the central controller 24, the portable user device 26, and the cloud network 28, it should be noted that various wired and wireless communication methodologies and connections may be implemented to work in conjunction with, or independent from, one or more local controllers associated with each individual components associated with the pool or spa system 20 (e.g., controller of the pump, controller of the heater, etc.)

Figure 2:
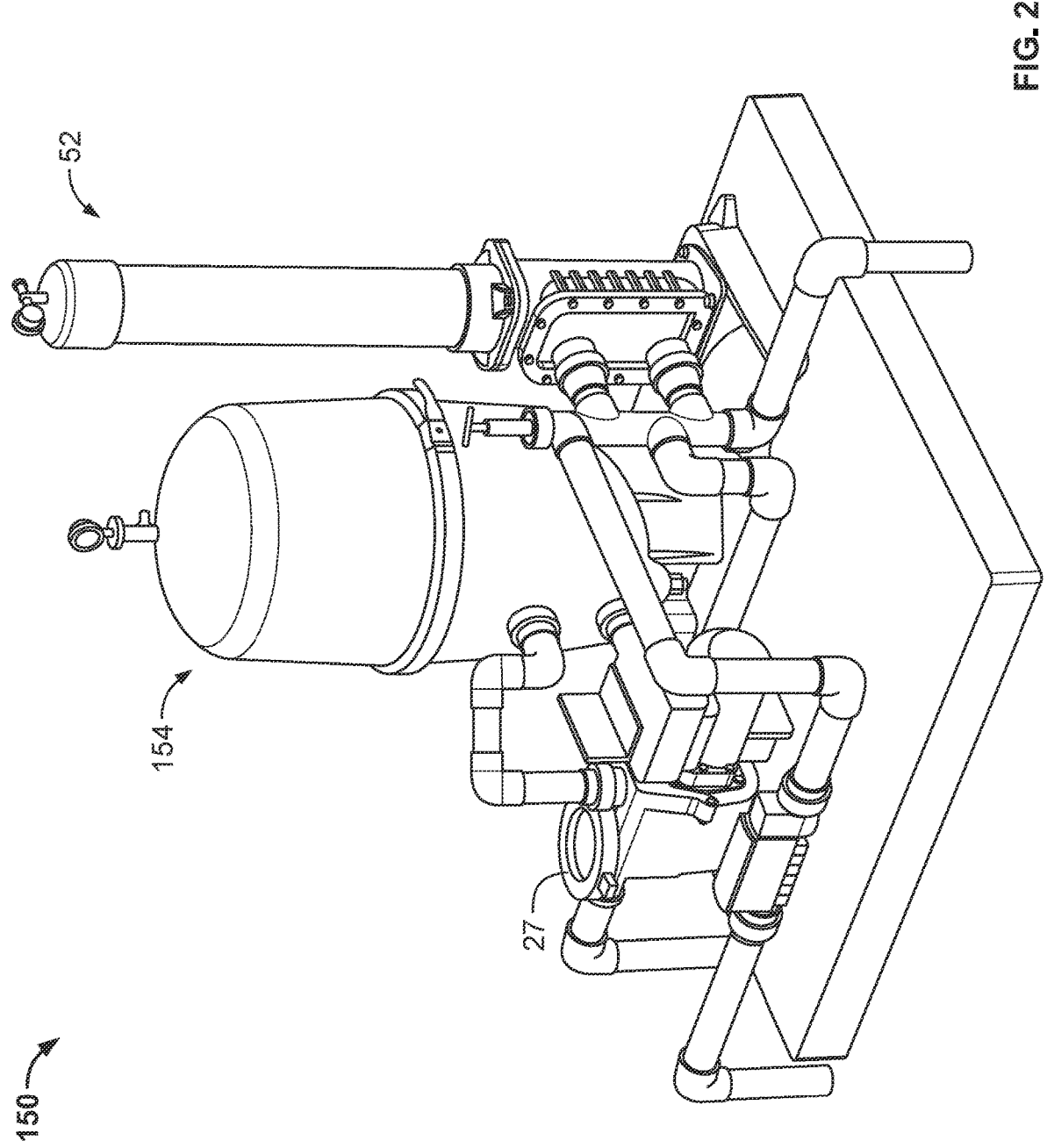
FIG. 2 is an isometric view of a pool filtration system including an auxiliary filter according to one embodiment.

FIG. 2 illustrates a pool filtration system 150 provided in the form of a main or primary pool filtration system 154 (e.g., filter 23) and an auxiliary filter 52. The auxiliary filter 52 may be provided adjacent to, and in fluid communication with the primary pool filtration system 154, as described in more detail hereinbelow. In some embodiments, the primary pool filtration system 154 and the auxiliary filter 52 are designed to be utilized in conjunction with each other. In other embodiments, the auxiliary filter 52 may be used independently. In various embodiments, the primary pool filtration system 154 is provided in the form of a traditional pool and spa filtration technology, such as, for example, a diatomaceous earth filter, pressure-fed sand filter, gravity sand filter, or cartridge filter.

Figure 3:
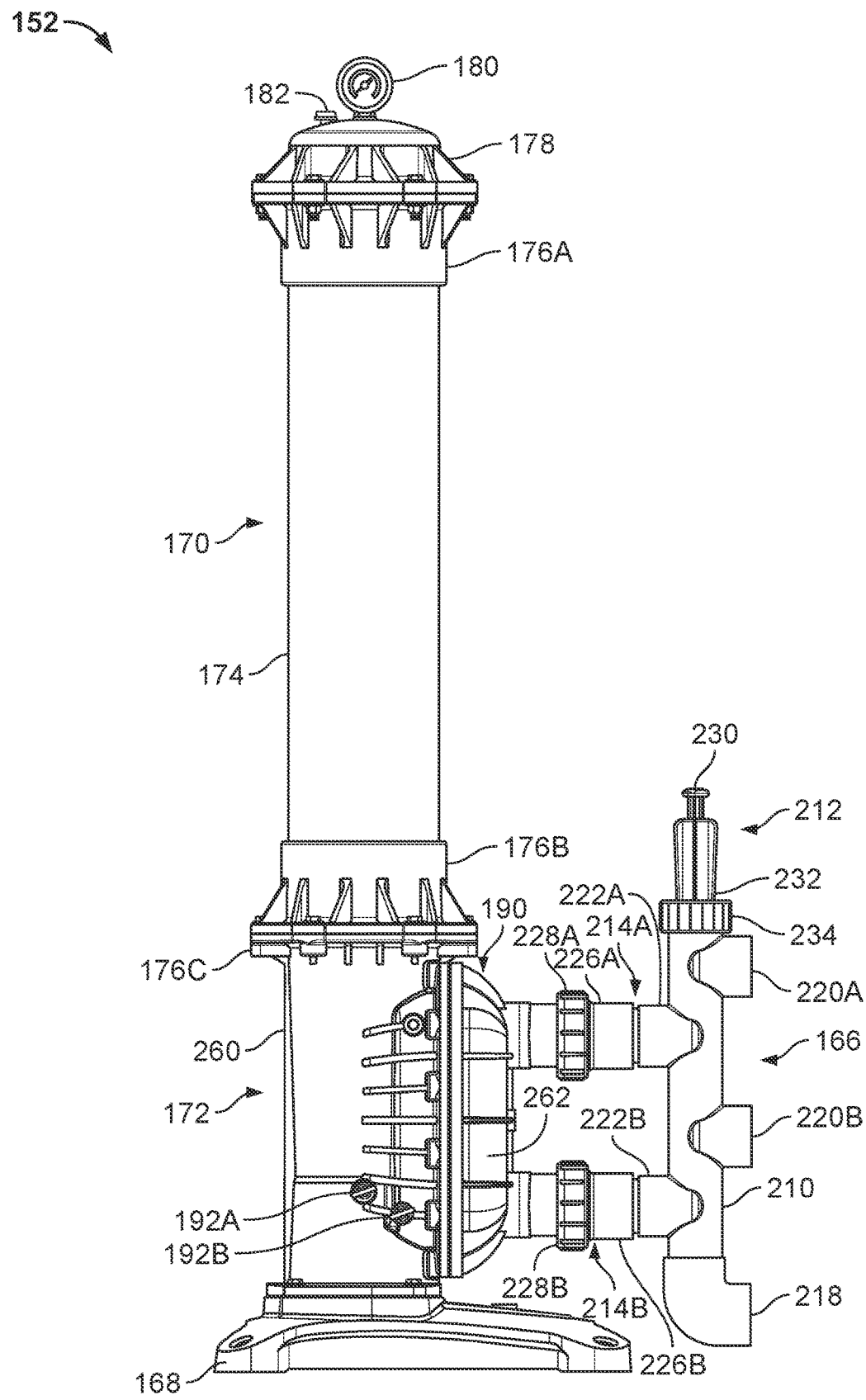
FIG. 3 is a side elevation view of an auxiliary filter according to one embodiment.
Figure 4:
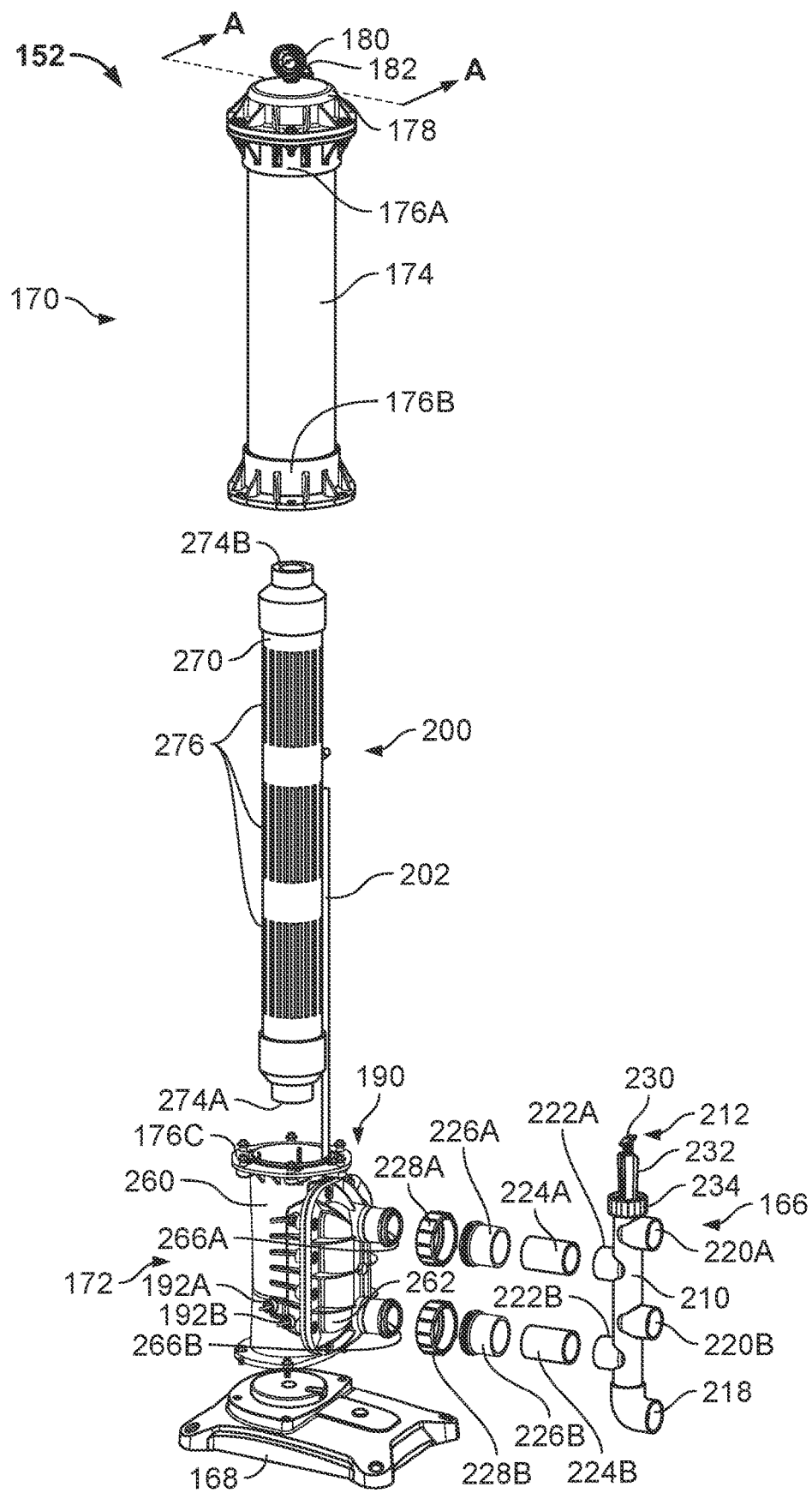
FIG. 4 is an exploded view of the auxiliary filter of FIG. 3.
Figure 5:
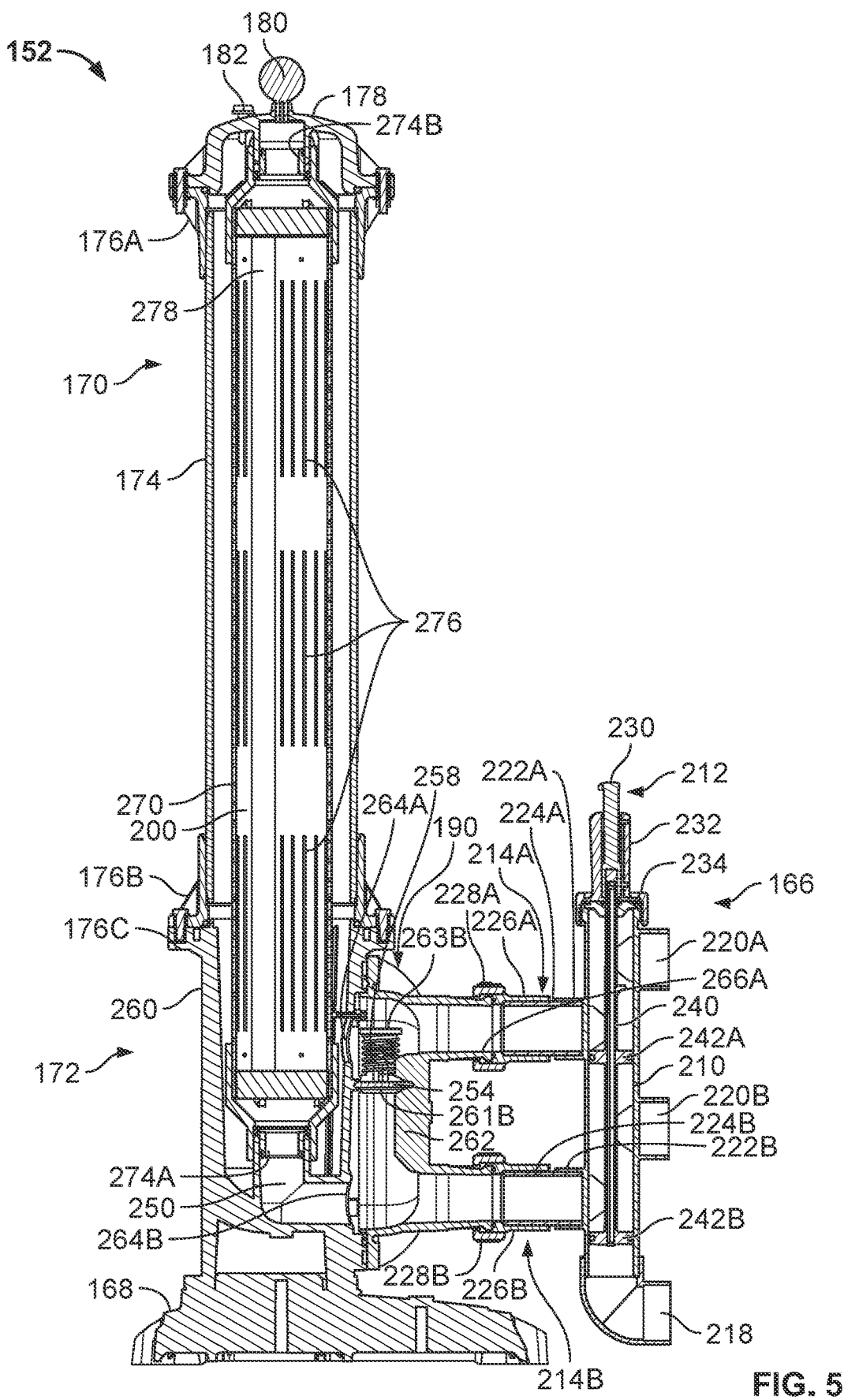
FIG. 5 is a cross-sectional view of the auxiliary filter of FIGS. 3-4 taken along line A-A of FIG. 4.

FIGS. 3-5 depict an auxiliary filter 152 according to one embodiment of the disclosure. The auxiliary filter 152 can be used within the pool filtration system 150 similarly to auxiliary filter 52, in conjunction with the primary pool filtration system 154. The auxiliary filter 152 can include a filtration vessel having a membrane filtration module 200 disposed therein, a conduit system 166 to provide fluid communication between the pool fluid circuit and the auxiliary filter 152, and a base 168 to provide stability and support to the auxiliary filter 152. In one embodiment, the filtration vessel is substantially cylindrical and is comprised as a separable assembly of components produced largely from polymeric materials, such as thermoplastics, having inherent resistance to common environmental and chemical stressors. The filtration vessel is provided in the form of a housing having an upper vessel 170 and a lower vessel 172 that are attached to form a substantially enclosed interior filtration chamber. Hydraulic integrity of the filtration vessel is achieved at one or more interconnections using seals (e.g., elastomeric) that provide a controlled-tolerance slip fit with a membrane filtration module 200 that is provided within the interior of the filtration vessel.

The upper vessel 170 is provided in the form of an elongated cylindrical tube 174 that includes end flanges 176A, 176B disposed on opposing ends of the tube 174. The end flanges 176A, 176B are provided as a mechanism to mechanically retain the upper vessel 170 to the lower vessel 172 using the end flange 176B, and retain a removable endcap 178 of the upper vessel 170 to the upper vessel 170 using the opposite end flange 176A, respectively, via bolts or other attachment mechanisms. The end flanges 176A, 176B are connected to the tube 174 via solvent-bonded glue sockets, however, other methods of construction may be employed, such as friction welding. In yet other embodiments, the entire upper vessel 170 may be manufactured by alternate methods such as injection, rotational or blow molding. The removable endcap 178 includes dedicated ports incorporating a pressure gauge 180 for status indication and an external air relief valve 182 to automatically release pressure from within the system. An automatic air release vent tube 202 is located inside the filtration vessel and adjacent to the filtration module 200. The vent tube 202 is designed to automatically release any trapped air within the filtration vessel. The vent tube 202 extends longitudinally through the filtration vessel, the top end terminating below the air release valve 182 located on the removable endcap 178, and the bottom end connecting with, and in fluid communication with a flow distribution manifold 190. In some forms, the vent tube 202 can be directly attached to a flow opening 264A, which is described in detail below.

Figure 6:
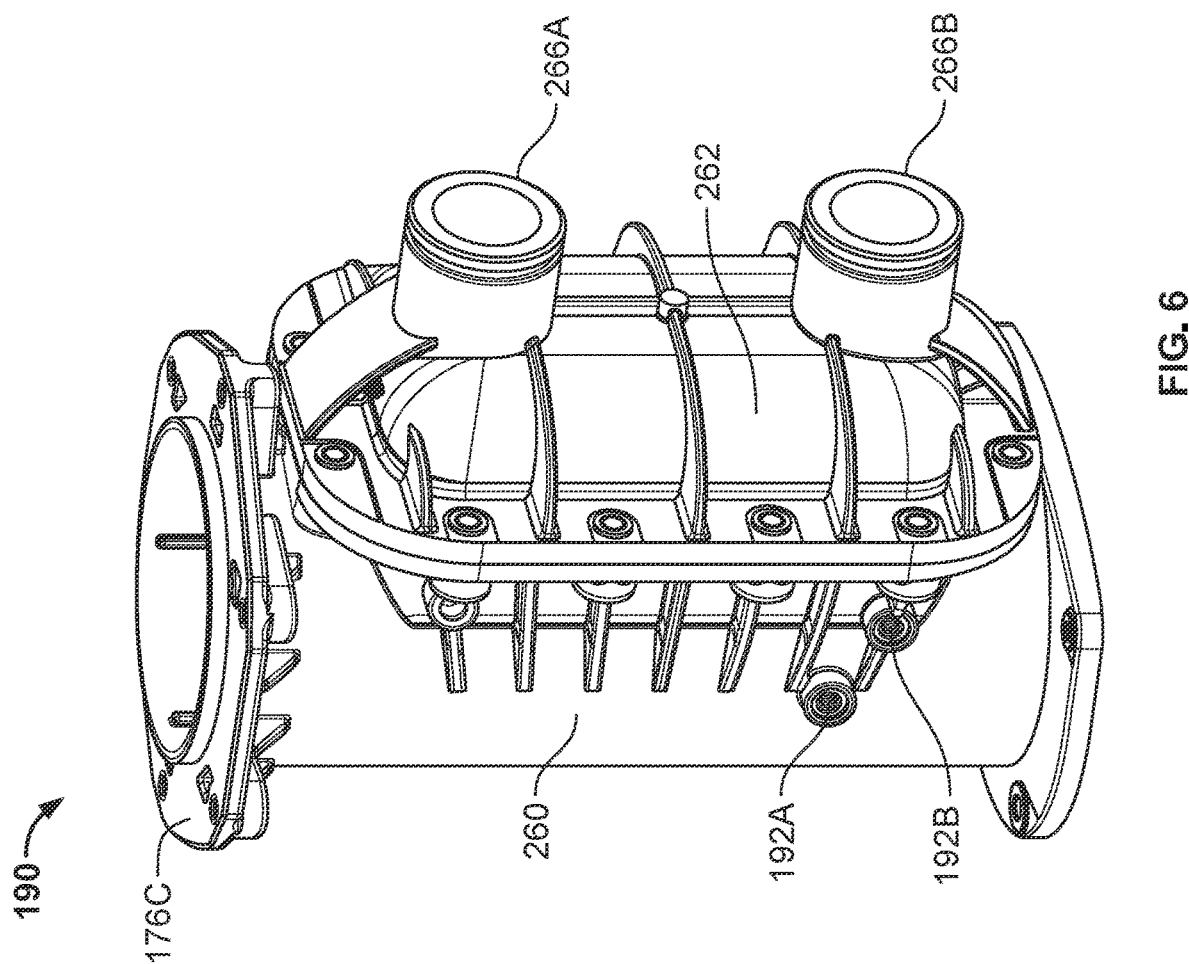
FIG. 6 is a front isometric view of a flow distribution manifold of the auxiliary filter of FIGS. 3-5.
Figure 7:
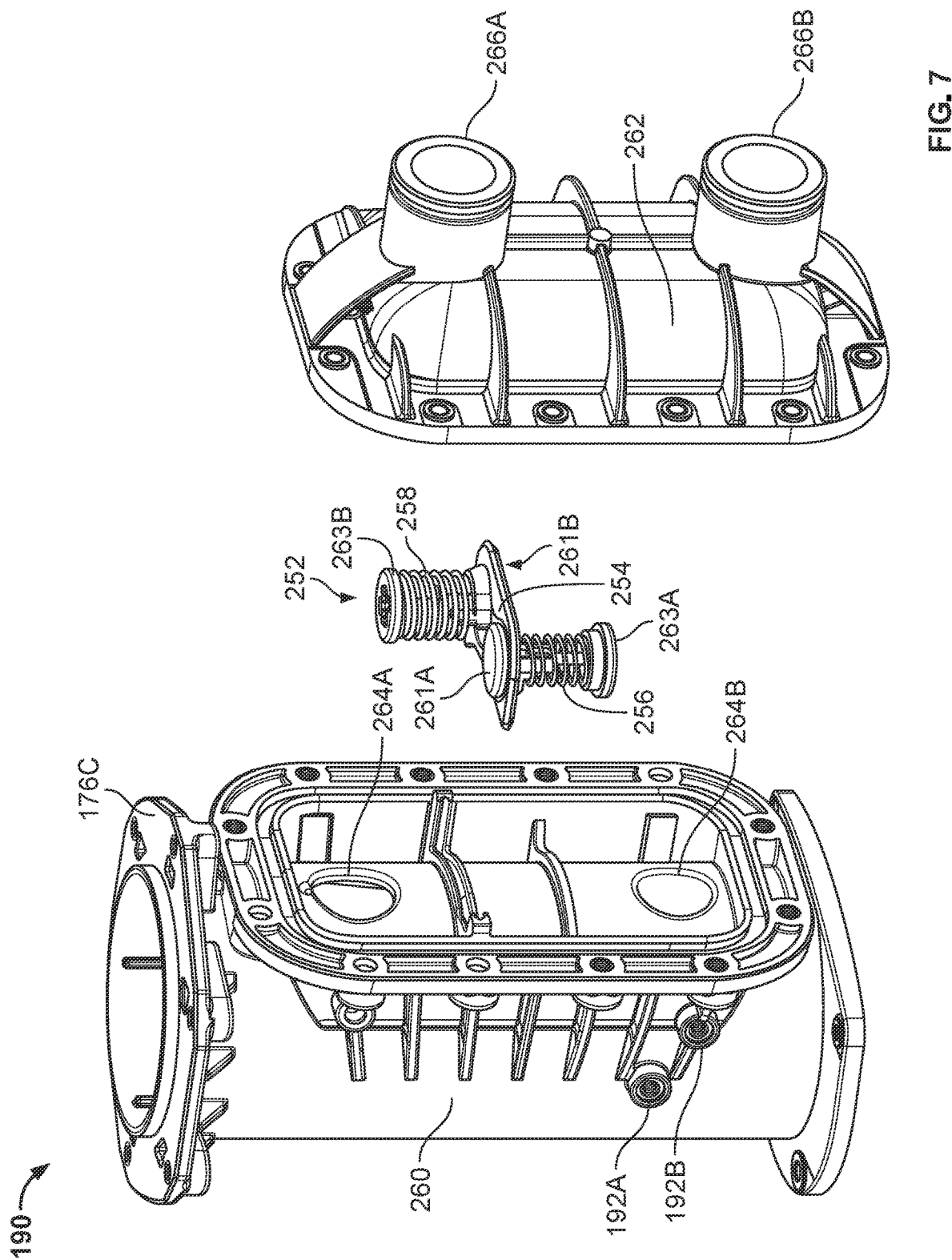
FIG. 7 is an exploded view of the flow distribution manifold of FIG. 6.

As best seen in FIGS. 3, 6, and 7, the lower vessel 172 is defined by a housing having a flow distribution manifold 190 and drain ports 192A, 192B. The lower vessel 172 is substantially cylindrical and is connected at its top end by end flange 176C to the end flange 176B of the upper vessel 170. The flow distribution manifold 190 is designed to direct fluid flow into and out of the auxiliary filter 152 and protrudes outwardly from a side of the lower vessel 172. The drain ports 192A, 192B are used to remove water from the lower vessel 172 and the flow distribution manifold 190 for service and/or winterization. The drain ports 192A, 192B are removed by unscrewing the threaded plug which has an elastomeric seal with the lower vessel 172. The base 168 is provided at the end of the lower vessel 172 and acts as a support for the auxiliary filter 152. The lower vessel 172 is coupled to the base 168 using a series of bolted fasteners. In some instances, the base 168 is provided as a plate with through holes that are designed to accommodate fasteners to assist in securing the auxiliary filter 152 to the pool pad or ground.

As shown in FIGS. 4 and 5, the conduit system 166 includes a substantially vertical valve manifold 210, a backwash flow reversing valve 212, and a substantially horizontal upper branch 214A and lower branch 214B extending outwardly from the valve manifold 210. The valve manifold 210 consists of a plurality of openings, including the effluent opening 220A and influent opening 220B, the upper branch port 222A and lower branch port 222B, and a waste port 218. The backwash valve 212 includes a push/pull handle 230 and valve cap 232, being connected to the valve manifold 210 with a nut 234.

Each branch 214A, 214B is defined by a pipe 224A, 224B, a union adapter 226A, 226B, and a union collar 228A, 228B. The union adapters 226A, 226B are each threaded to the respective pipes 224A, 224B, and union collars 228A, 228B. A first end of each of the pipes 224A, 224B connects to the branch ports 222A, 222B. The opposite end of the union collars 228A, 228B are each threaded to the influent port 266B and the effluent port 266A of the flow distribution manifold 190. The upper branch port 222A and lower branch port 222B are provided with substantially the same structure as each other. It should be understood that although the forgoing disclosure discusses various threaded connections, any number of coupling mechanisms can be used to connect the elements of the conduit system 166 such as friction welding or solvent bonding.

As shown in FIG. 5, a push/pull shaft 240 is coaxially disposed within the valve manifold 210 and connected to the backwash flow reversing valve 212. The shaft 240 is provided in the form of a substantially vertical rod with two disks 242A, 242B projecting out from the shaft 240 to the internal walls of the valve manifold 210, and disposed adjacent a middle portion and a bottom end of the shaft 240, respectively. The disks 442A, 442B 242A, 242B create a fluid tight seal against the walls of the valve manifold, either by way of direct contact or by using an o-ring extending around the outer circumference of each disk 242A, 242B. The shaft 240 actuates between a dead-end filtration position to provide a dead-end filtration mode and a backwash position to provide a backwash mode as described further below. Although the flow reversing valve 212 is described as a manual, mechanical actuator, other forms of actuators may be used. For example, other hydraulic, pneumatic, or electro-mechanical linear actuators can be used to raise and lower the shaft 240. The flow reversing valve 212 may also include wireless communication to any or all of the central controller 24, the portable user device 26, the cloud network 28, or other network to allow wired or wireless remote control of the actuator.

Referring further to the flow distribution manifold 190, as shown in FIGS. 6 and 7, the flow distribution manifold 190 consists of a manifold base 260 and a manifold cover 262, with the manifold base 260 and manifold cover 262 coupled together using a series of bolted fasteners. The manifold base 260 includes two flow openings 264A, 264B. In one embodiment, when a dead-end filtration mode is activated, the lower flow opening 264B is designed to be utilized for fluid flow into the filtration module 200 and the upper flow opening 264A is designed to be utilized for fluid flow out of the filtration module 200. In one embodiment, when a backwash mode is activated, the upper flow opening 264A is designed to be utilized for fluid flow into the filtration module 200 and the lower flow opening 264B is designed to be utilized for fluid flow out of the filtration module 200. The manifold cover 262 further includes effluent port 266A and influent port 266B, which connect to the conduit system 166 through upper and lower branches 214A, 214B of the conduit system 166.

As shown in FIGS. 5 and 7, a bypass mechanism 252 is provided within the flow distribution manifold 190 to allow a portion of the fluid flowing into and out of the auxiliary filter 152 to bypass the membrane filtration module 200. In some embodiments of the bypass mechanism 252, the membrane filtration module 200 is partially bypassed in one of the dead-end filtration mode or the backwash mode. In some embodiments of the bypass mechanism 252, the membrane filtration module 200 in partially bypassed in both of the dead-end filtration mode and the backwash mode. The bypass mechanism 252 consists of a substantially rectangular bypass base plate 254, a bypass spring 256, a backwash spring 258, two stem valves 261A, 261B and two bypass retainer caps 263A, 263B. The stem valves 261A and 261B extend through, and are supported by, the bypass base plate 254. The bypass spring 256 is retained between the bypass base plate 254 and retainer cap 263A by the stem valve 261A. The backwash spring 258 is retained between the bypass base plate 254 and retainer cap 263B by the stem valve 261B. The stem valves 261A, 261B selectively allow one-way flow. In the dead-end filtration mode, fluid is selectively allowed to flow from the influent port 266B to the effluent port 266A without traveling through the membrane filtration module 200. In the backwash mode, fluid is selectively allowed to flow from the effluent port 266A to the influent port 266B without traveling through the membrane filtration module 200.

In some forms, the bypass spring 256 and the backwash spring 258 are sized and shaped differently, and have different spring constants to provide a differing nominal flux for the dead-end filtration mode and the backwash mode. For example, the backwash spring 258 can have a smaller diameter, longer length, or a thicker spring wire than the bypass spring 256 or vice versa. Accordingly, the backwash spring 258 can include a stiffness value higher than the stiffness value of the bypass spring 256, requiring a greater pressure to actuate the stem valve 261B than to actuate the stem valve 261A or vice versa. The bypass base plate 254 can include asymmetric spring mating features that prevent improper spring installation in the instance that the backwash spring 258 and the bypass spring 256 are dissimilar. For example, the bypass base plate 254 can include a seating groove to receive a spring with a diameter corresponding to the bypass spring 256, and a seating groove to receive a spring of a different (larger or smaller) diameter corresponding to the backwash spring 258. The bypass base plate 254 and manifold base 260 can further include other asymmetric features to prevent incorrect installation of the bypass spring 256, backwash spring 258, or the bypass base 254. The bypass retainer caps 263A and 263B can have provisions to accept either spring diameter.

The bypass mechanism 252 acts as an automatic flow control device designed to provide an optimal volumetric flow rate to the filtration module 200 over a wide operating range of full filtration system volumetric flow rates, while limiting negative impacts of the hydraulic restrictions of the auxiliary filter 152. It is generally known that the hydraulic resistance increases as a second-order polynomial with volumetric flow rate for a fixed restriction. The automatic flow control employed by the bypass mechanism 252 creates an inflection point in the resistance curve at an intended volumetric flow and pressure, which limits the additional system restriction according to a linear spring equation $F=k*x$. In some embodiments, the automatic flow control may be of the pressure-compensating type providing additional practical benefits for operating over a wider range of system flow rates and transmembrane pressures. In one embodiment, the flow control is of the non-compensating type.

As illustrated in FIGS. 4, 5, 8, and 9, a membrane filtration module 200 is provided. The membrane filtration module 200 is coaxially received within the filtration vessel of the auxiliary filter 152. The membrane filtration module 200 is provided in the form of filtration media that may be a discrete cartridge element. In other embodiments, a plurality of elements may be employed, arranged in a series and/or parallel array co-located inside of a common vessel of the auxiliary filter 152. As shown in FIG. 5, the bottom opening of the filtration module 200 is connected to an elbow-shaped fluid channel 250 located within the flow distribution manifold 190 to provide fluid communication between the pool fluid circuit and the auxiliary filter 152.

Figure 8:
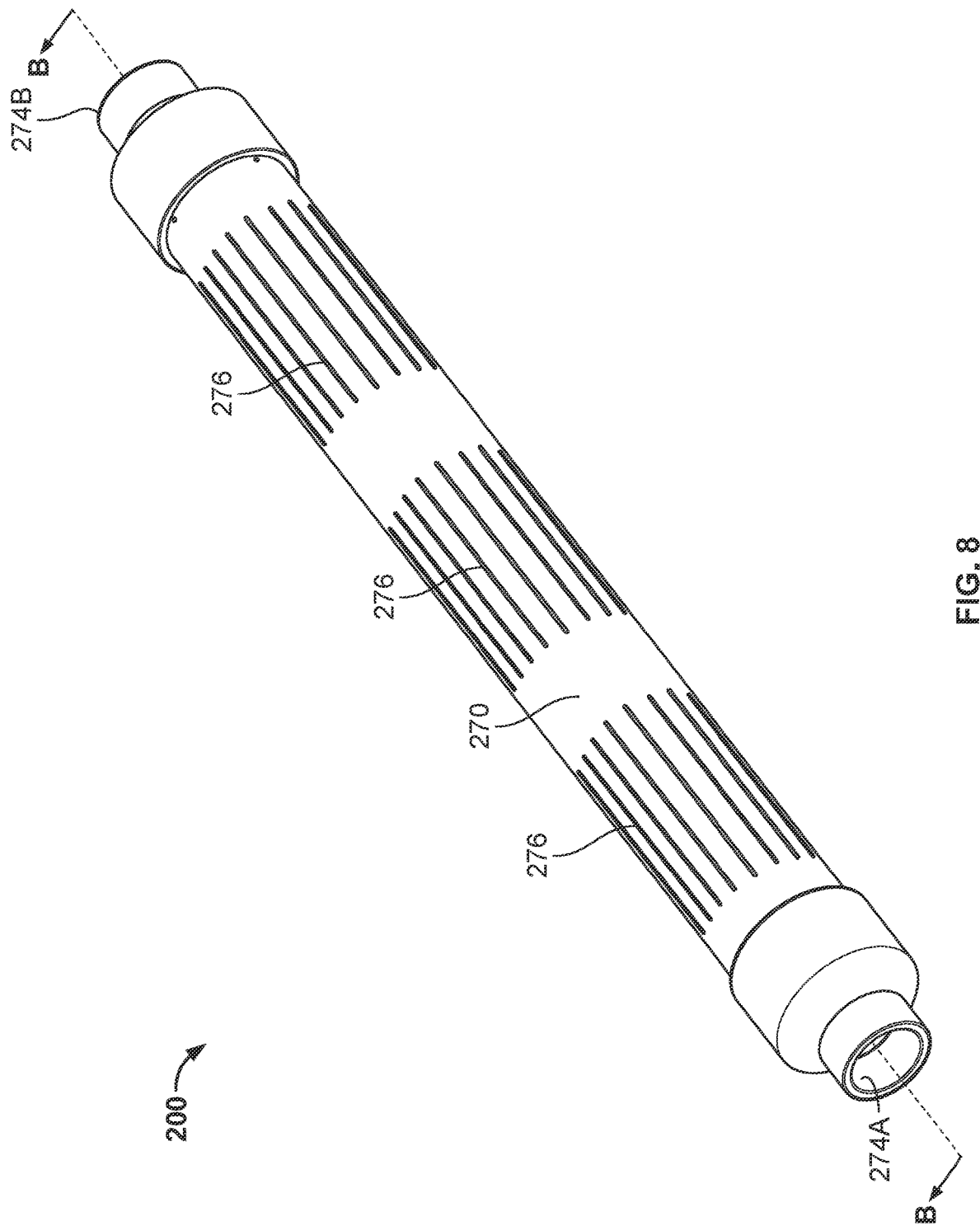
FIG. 8 is an isometric view of a membrane filtration module of the auxiliary filter of FIGS. 3-5.
Figure 9:
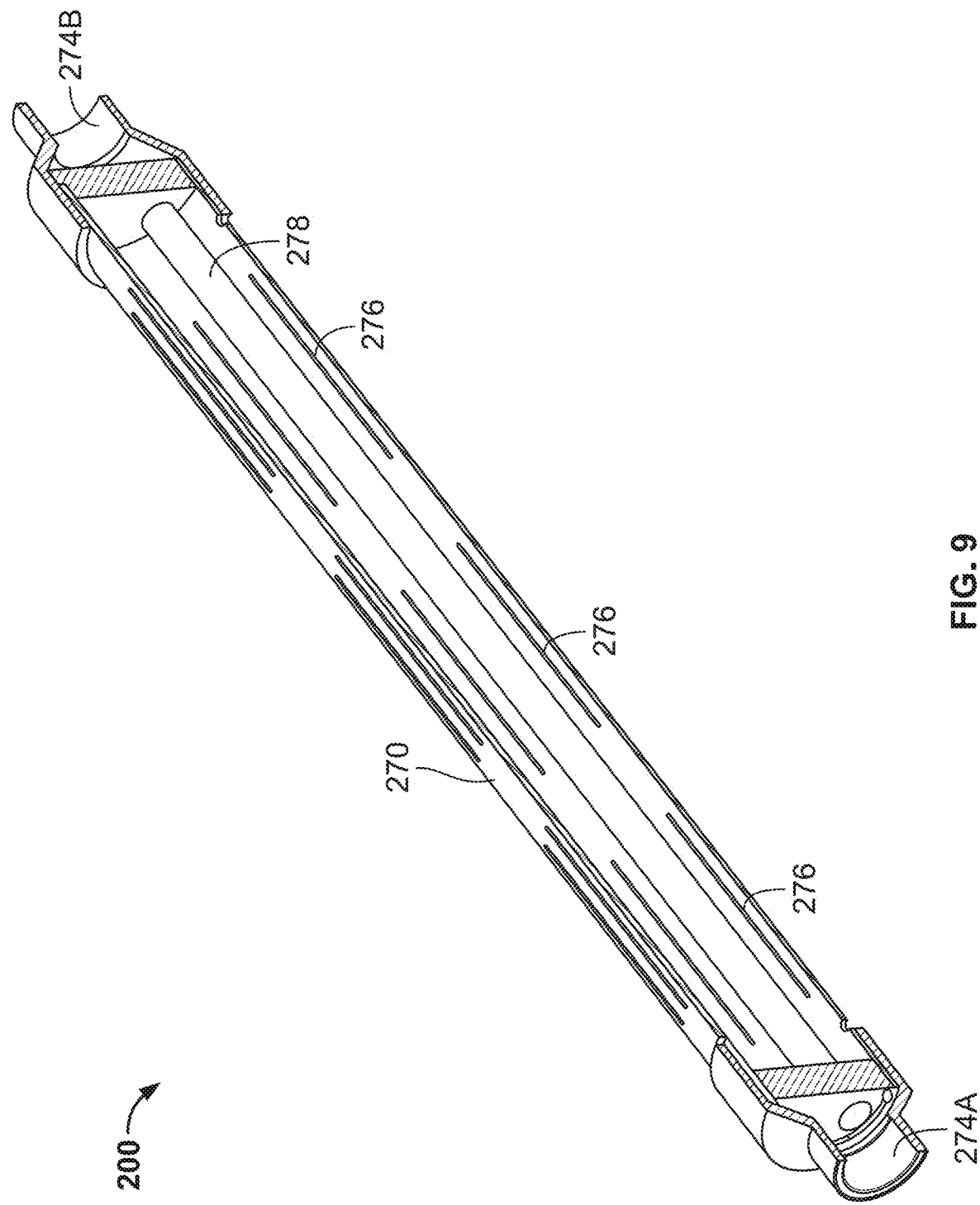
FIG. 9 is a cross-sectional view of the membrane filtration module of FIG. 8 taken along line B-B of FIG. 8.

FIGS. 8 and 9 illustrate the membrane filtration module 200 in more detail. In one embodiment, the filtration module 200 is provided as a high aspect ratio length to width cylinder made of an assemblage of components produced largely from polymeric materials, such as thermoplastics having inherent resistance to common environmental and chemical stressors. The filtration module 200 is provided in the form of a filter housing 270, membrane fibers (not shown) disposed within the housing, feed openings 274A, 274B, filtrate openings 276, and an integrated flow distribution conduit 278. The membrane fibers can, for example, be arranged around the distribution conduit 278 within the interior of the filter housing 270. The filter housing 270 can be produced as a perforated permeate shell, with a plurality of filtrate openings 276, which provides a number of practical benefits, including a reduction of hydraulic flow resistance, more uniform flow distribution and inherent backwash protection, while maintaining structural integrity and physical ingress protection.

The plurality of filtrate openings 276 are provided in the form of longitudinal apertures with a high length to width aspect ratio, and the filtrate openings 276 are organized into one or more equidistant circumferential arrays. In some embodiments, the filtrate openings 276 could also be suitably produced as a series of circular or otherwise-shaped holes of uniform or varied cross-section arranged spatially in a selective pattern so as to produce the benefits disclosed herein. The feed openings 274A, 274B are provided on opposing ends of the filtration module 200 to permit rapid assembly/disassembly with the outer filtration vessel, while concurrently providing suitable sealing to limit undesirable bypass of the filtration media during operation due to a pressure differential. In one embodiment, the feed opening 274A, 274B vessel connection is realized as a controlled-tolerance slip fit of polymeric components, such as thermoplastics with opposing internal and external portions. In other embodiments, an elastomeric seal or controlled-tolerance press fit may be employed to further limit unintentional bypass. The integrated flow distribution conduit 278 is provided within the filter housing 270 of the filtration module 200. The flow distribution conduit 278 extends along substantially the entire length of the interior of the filtration module 200, and fluidly connects the feed openings 274A, 274B of the filtration module 200. The flow distribution conduit 278 helps to decrease hydraulic resistance, provide more uniform loading, and improve backwash performance. Furthermore, in one embodiment, the filtration module 200 employs one or a plurality of selectively hydrophobic membranes, which allow for improved de-aeration of the filtration module 200 during transmembrane pressures encountered during typical operation, as entrapped air is generally known to be undesirable for operation.

In all embodiments, membrane filtration operates as a physical barrier via a size-exclusion mechanism consistent with traditional sand, diatomaceous earth and pleated cartridge pool and spa filter media. In one embodiment, the membrane fibers can be of the asymmetric hollow fiber type, produced from selective homopolymer or copolymer which provides desired pore structure for size-exclusion filtration in conjunction with required structural rigidity. In other embodiments, the fibers could be produced as a symmetric type with uniform pore structure, or as a layer deposited onto a structural core. In yet other embodiments, the fibers could instead be produced from silicon carbide ceramic having a controlled crystalline or lattice structure.

In one embodiment, the membrane fibers are ultrafiltration membranes, having a nominal pore size of between about 20 to about 40 nanometers and a lumen diameter of between about 0.8 millimeters to about 1.5 millimeters. In other embodiments, the membrane fibers may be microfiltration membranes having a nominal pore size of between about 130 to about 200 nanometers and a lumen diameter between about 0.8 millimeters to about 1.5 millimeters. The ultrafiltration membranes can be operated in dead-end, inside-out deposition mode and fouling recovery is achieved via flux reversal by activating the backwash mode.

Figure 10:
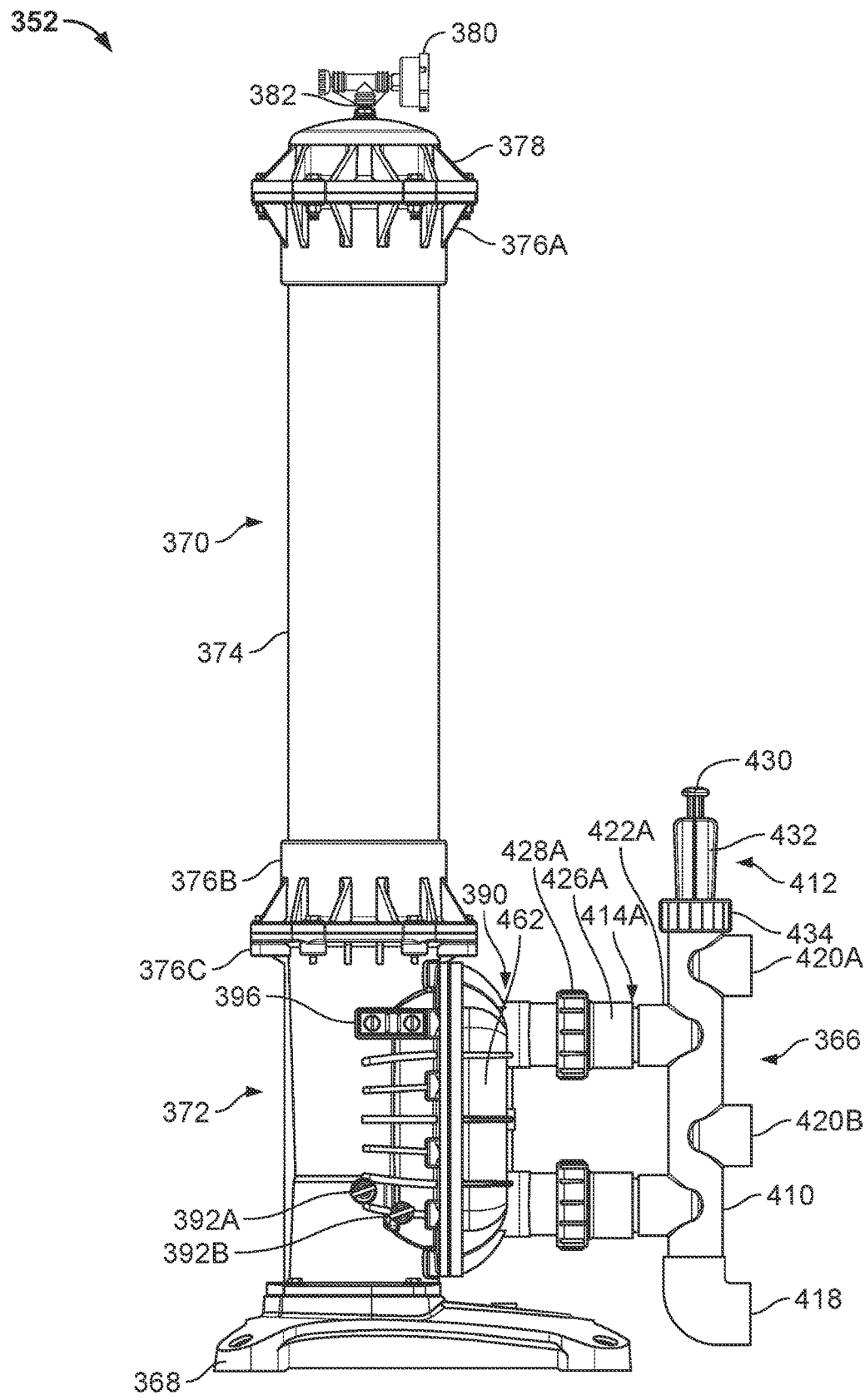
FIG. 10 is a side elevational view of the auxiliary filter according to one embodiment.
Figure 11:
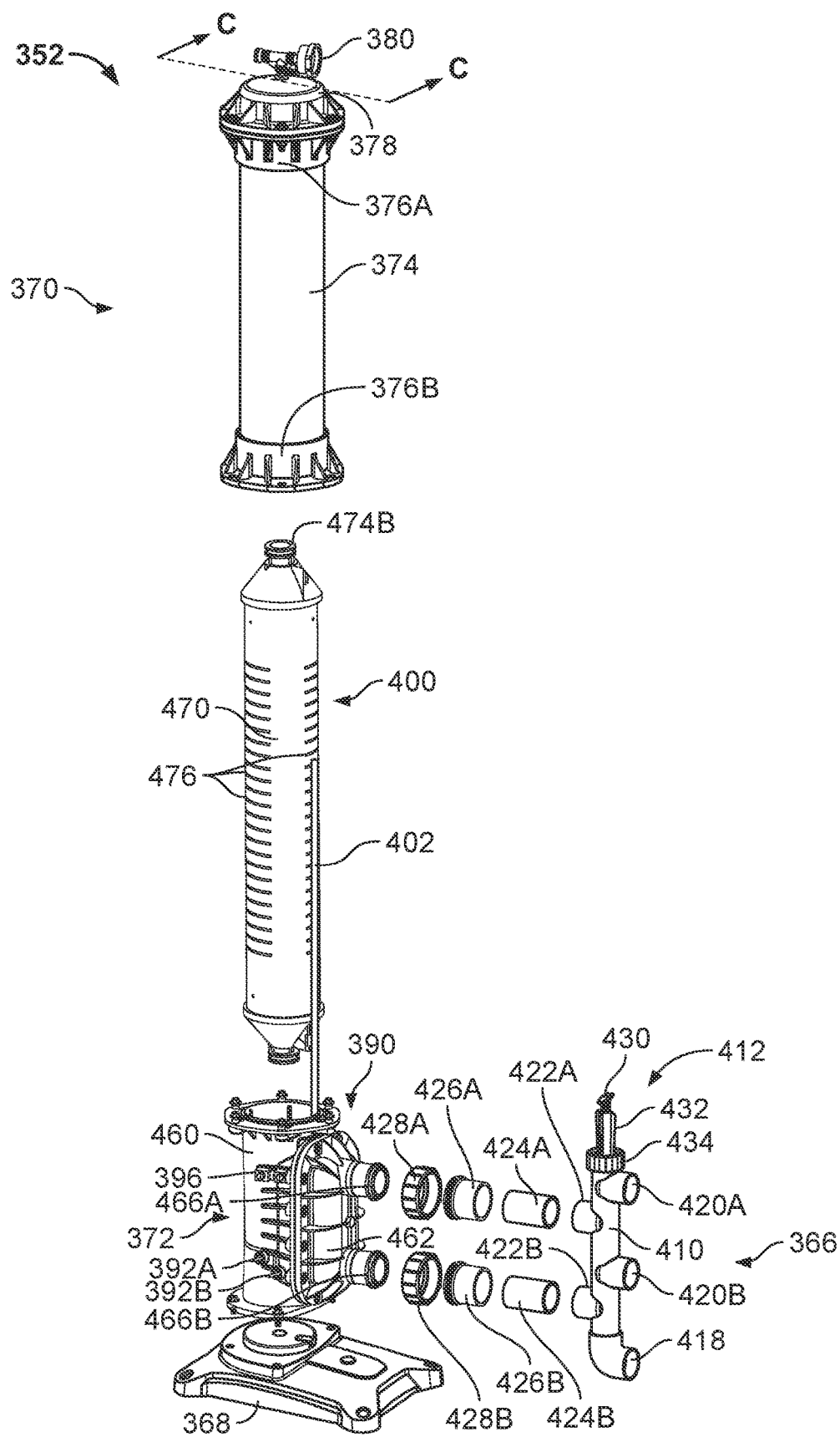
FIG. 11 is an exploded view of the auxiliary filter of FIG. 10.
Figure 12:
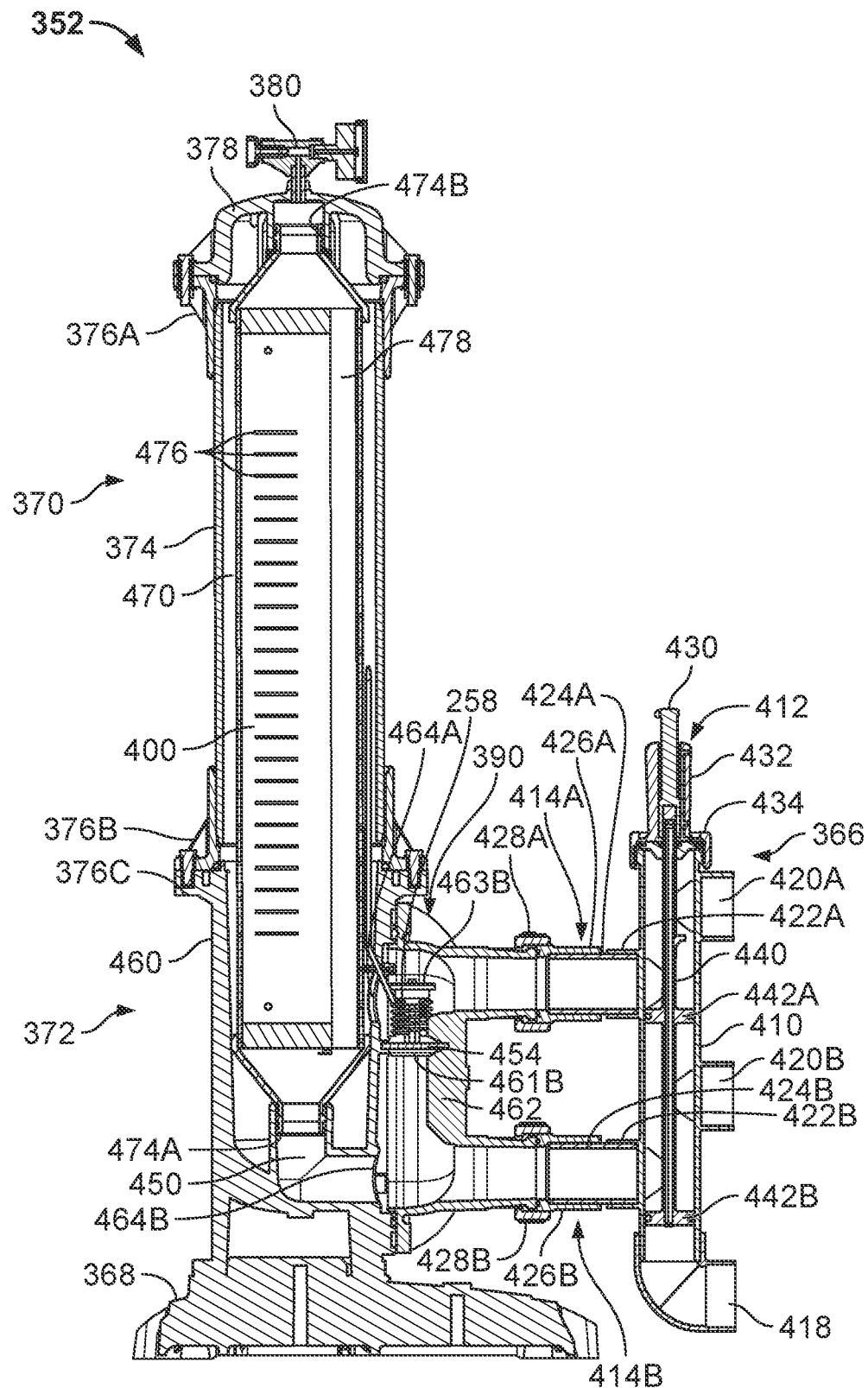
FIG. 12 is a cross-sectional view of the auxiliary filter of FIG. 10 taken along line C-C of FIG. 11.

FIGS. 10-12 illustrate an alternative auxiliary filter 352, which shares many similar functional aspects with auxiliary filter 152 and can be used with the pool filtration system 150 similar to auxiliary filter 52. Accordingly, the principles and structures as described above with respect to auxiliary filter 152 can be imputed herein to the description of the auxiliary filter 352 and vice versa. The auxiliary filter 352 can include a filtration vessel having a membrane filtration module 400 disposed therein, a conduit system 366 to provide fluid communication between the pool fluid circuit and the auxiliary filter 352, and a base 368 to provide stability and support to the auxiliary filter 352. The filtration vessel is provided in the form of a housing having an upper vessel 370 and a lower vessel 372 that are attached to form a substantially enclosed interior filtration chamber.

The upper vessel 370 is provided in the form of an elongated cylindrical tube 374 that includes end flanges 376A, 376B disposed on opposing ends of the tube 374. The end flanges 376A, 376B are provided as a mechanism to mechanically retain the upper vessel 370 to the lower vessel 372 using the end flange 376B, and retain a removable endcap 378 of the upper vessel 370 to the upper vessel 370 using the opposite end flange 376A, respectively, via bolts or other attachment mechanisms. The removable endcap 378 includes dedicated ports incorporating a pressure gauge 380 for status indication and an external air relief valve 382 to automatically release pressure from within the system. An automatic air release vent tube 402 is located inside the filtration vessel and adjacent to the filtration module 400. The vent tube 402 extends longitudinally throughout the filtration vessel, the top end terminating below the air release valve 382 located on the removable endcap 378, and the bottom end connecting with, and in fluid communication with a flow distribution manifold 390. In some forms, the vent tube 402 can be directly attached to a flow opening 264A, which is described in detail below.

As best seen in FIGS. 10-12, the lower vessel 372 is defined by a housing having a flow distribution manifold 390 and drain ports 392A, 392B. The lower vessel 372 is substantially cylindrical and is connected at its top end by end flange 376C to the end flange 376B of the upper vessel 370. The flow distribution manifold 390 is designed to direct fluid flow into and out of the auxiliary filter 352 and protrudes outwardly from a side of the lower vessel 372. The lower vessel 372 of the auxiliary filter 352 also includes two pressure measurement ports 394A, 394B with a differential pressure gauge 396 that can be used to measure differential pressure as will be described further below.

The base 368 is provided at the end of the lower vessel 372 and acts as a support for the auxiliary filter 352. The lower vessel 372 is coupled to the base 368 using a series of bolted fasteners. In some instances, the base 368 is provided as a plate with through holes that are designed to accommodate fasteners to assist in securing the auxiliary filter 352 to the pool pad or ground.

As shown in FIG. 10-12, the conduit system 366 includes a substantially vertical valve manifold 410, a backwash flow reversing valve 412, and a substantially horizontal upper branch 414A and lower branch 414B extending outwardly from the valve manifold 410. The valve manifold 410 consists of a plurality of openings, including the effluent opening 420A and influent opening 420B, the upper branch port 422A and lower branch port 422B, and a waste port 418. The backwash valve 412 includes a push/pull handle 430 and valve cap 432, being connected to the valve manifold 410 with a nut 434.

Each branch 414A, 414B is defined by a pipe 424A, 424B, a union adapter 426A, 426B, and a union collar 428A, 428B. The union adapters 426A, 426B are each threaded to the respective pipes 424A, 424B, and union collars 428A, 428B. A first end of each of the pipes 424A, 424B connects to the branch ports 422A, 422B. The opposite end of the union collars 428A, 428B are each threaded to the influent port 466B and the effluent port 466B of the manifold 390.

As shown in FIG. 12, a push/pull shaft 440 is coaxially disposed within the valve manifold 410 and connected to the backwash flow reversing valve 412. The shaft 440 is provided with two disks 442A, 442B projecting out from the shaft 440 to the internal walls of the valve manifold 410, and disposed adjacent a middle portion and a bottom end of the shaft 440, respectively. The disks 442A, 442B create a fluid tight seal against the walls of the valve manifold, either by way of direct contact or by using an o-ring extending around the outer circumference of each disk 442A, 442B. The valve manifold 410 operation of switching between the dead-end filtration mode and the backwash mode is described further below with respect to FIGS. 17 and 18.

Figure 13:
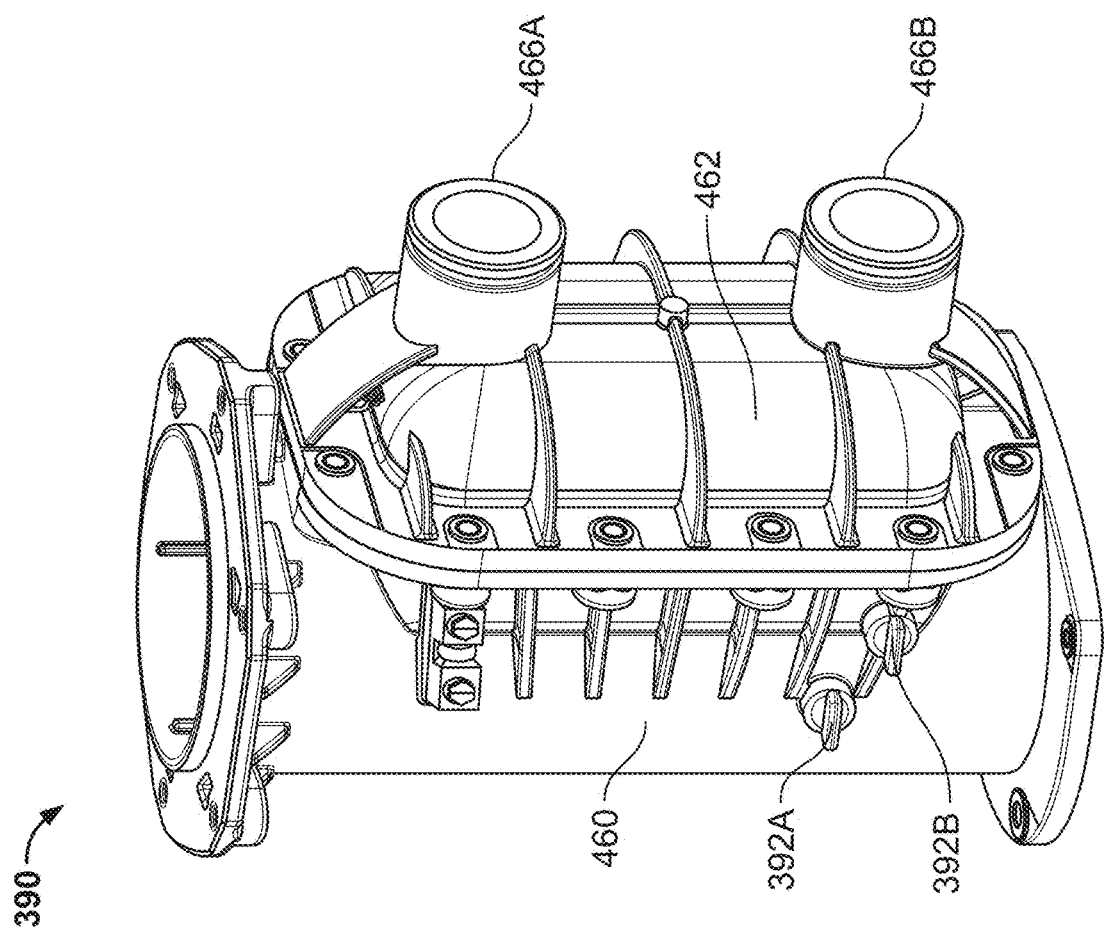
FIG. 13 is a front isometric view of a flow distribution manifold of the auxiliary filter of FIGS. 10-12.
Figure 14:
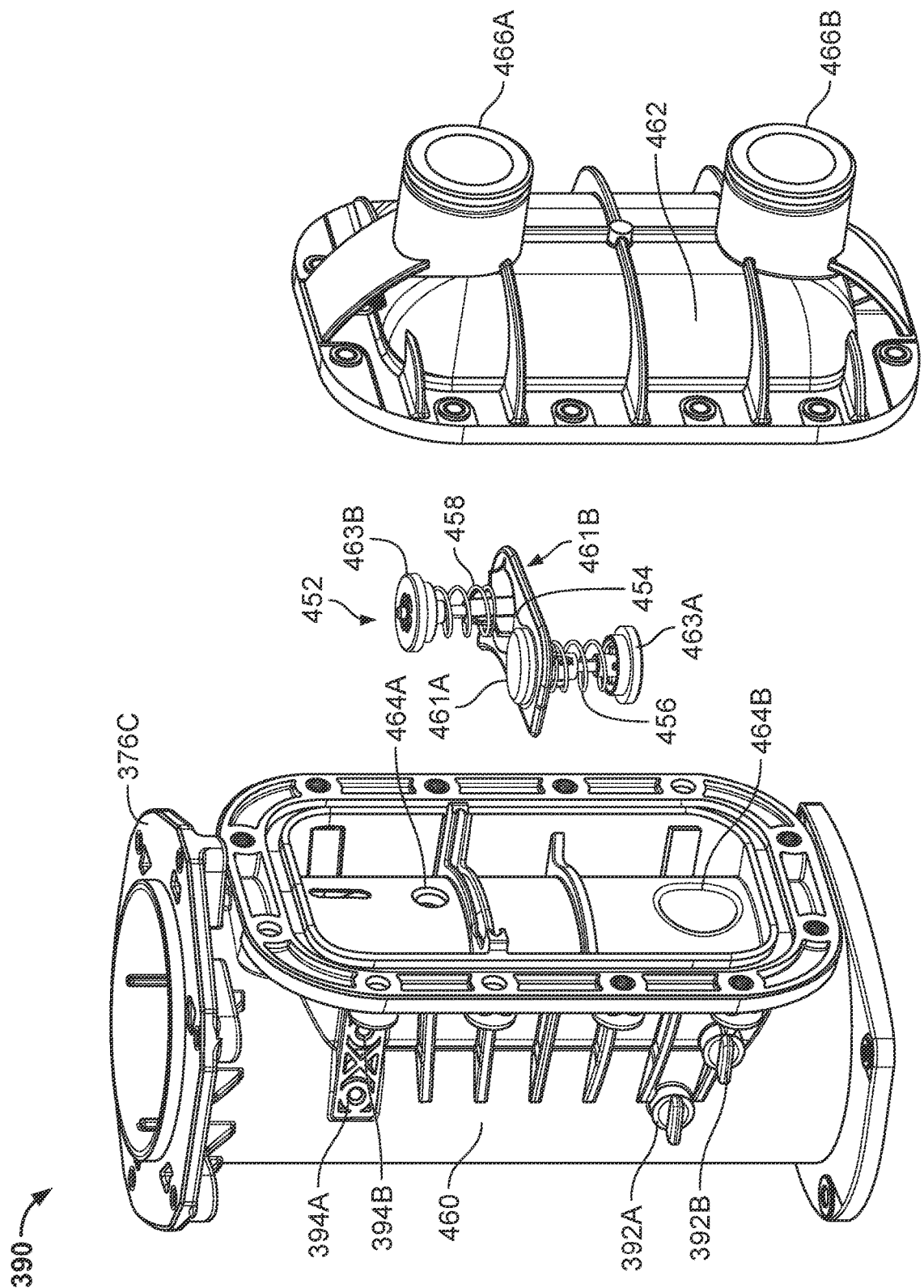
FIG. 14 is an exploded view of the flow distribution manifold of FIG. 13.

Referring further to the flow distribution manifold 390, as shown in FIGS. 13 and 14, the flow distribution manifold 390 consists of a manifold base 460 and a manifold cover 462, with the manifold base 460 and manifold cover 462 coupled together using a series of bolted fasteners. The manifold cover 462 further includes an effluent port 466A and an influent port 466B, which connect to the conduit system 366 through upper and lower branches 414A, 414B of the conduit system 366, as described in more detail below.

The manifold base 460 includes two flow openings 464A, 464B. In contrast to the flow openings 264A, 264B of the auxiliary filter 152, the flow openings 464A, 464B of the auxiliary filter 352 can be sized and shaped differently from one another. For example, the flow opening 464A can have a smaller diameter than the diameter of the flow opening 464B, or vice versa. In some embodiments, the flow opening 464A has a diameter that is less than ½ the diameter of the flow opening 464B. In some embodiments, the flow opening 464A has a diameter that is less than ¼ the diameter of the flow opening 464B. In some embodiments, the flow opening 464A has a diameter that is less than ⅛ the diameter of the flow opening 464B. This difference in the diameter creates a pressure differential that increases with flow and can be used as a means to indicate the loading status of the filter using the differential pressure gauge 396. The pressure measurement port 394A extends into the flow distribution manifold 390 upstream (during dead-end filtration) of the flow opening 464A outside of the membrane filtration module 400, and the pressure port 394B extends into the manifold base 460 and downstream (during dead-end filtration) of the flow opening 464A during dead-end filtration. Accordingly, the differential pressure gauge 396 can measure the differential pressure across the flow opening 464A. Although the depicted flow distribution manifold 390 includes a single differential pressure gauge, it is understood that one or more analog, digital, binary, continuous, or other pressure gauges can be used with the flow distribution manifold 390. Also, the pressure gauge 396 may include wireless communication to any or all of the central controller 24, the portable user device 26, the cloud network 28, or other network to allow wired or wireless transmission of data to and from the pressure gauge 396.

As shown in FIGS. 12 and 14, a bypass mechanism 452 is provided within the flow distribution manifold 390 to allow a portion of the fluid flowing into and out of the auxiliary filter 352 to bypass the membrane filtration module 400 similar to the bypass mechanism 252 of the auxiliary filter 152. The bypass mechanism 452 consists of a substantially rectangular bypass base plate 454, a bypass spring 456, a backwash spring 458, two stem valves 461A, 461B and two bypass retainer caps 463A, 463B. The stem valves 461A and 461B extend through, and are supported by, the bypass base plate 454. The bypass spring 456 is retained between the bypass base plate 454 and retainer cap 463A by the stem valve 461A. The backwash spring 458 is retained between the bypass base plate 454 and retainer cap 463B by the stem valve 461B. The stem valves 461A, 461B selectively allow one-way flow. In the dead-end filtration mode, fluid is selectively allowed to flow from the influent port 466B to the effluent port 466A without traveling through the membrane filtration module 400. In the backwash mode, fluid is selectively allowed to flow from the effluent port 466A to the influent port 466B without traveling through the membrane filtration module 400.

In some forms, the bypass spring 456 and the backwash spring 458 are sized and shaped differently, and have different spring constants to provide a differing nominal flux for the dead-end filtration mode and the backwash mode. Accordingly, the asymmetric features and principles described above with respect to the bypass mechanism 252 apply similarly to the bypass mechanism 452

As illustrated in FIGS. 11, 12, 15, and 16, a membrane filtration module 400 is provided. The membrane filtration module 400 is coaxially received within the filtration vessel of the auxiliary filter 352. The membrane filtration module 400 is provided in the form of filtration media that may be a discrete cartridge element. In other embodiments, a plurality of elements may be employed, arranged in a series and/or parallel array co-located inside of a common vessel of the auxiliary filter 352. As shown in FIG. 12, the bottom opening of the filtration module 400 is connected to an elbow-shaped fluid channel 450 located within the manifold 390 to provide fluid communication between the pool fluid circuit and the auxiliary filter 352.

Figure 15:
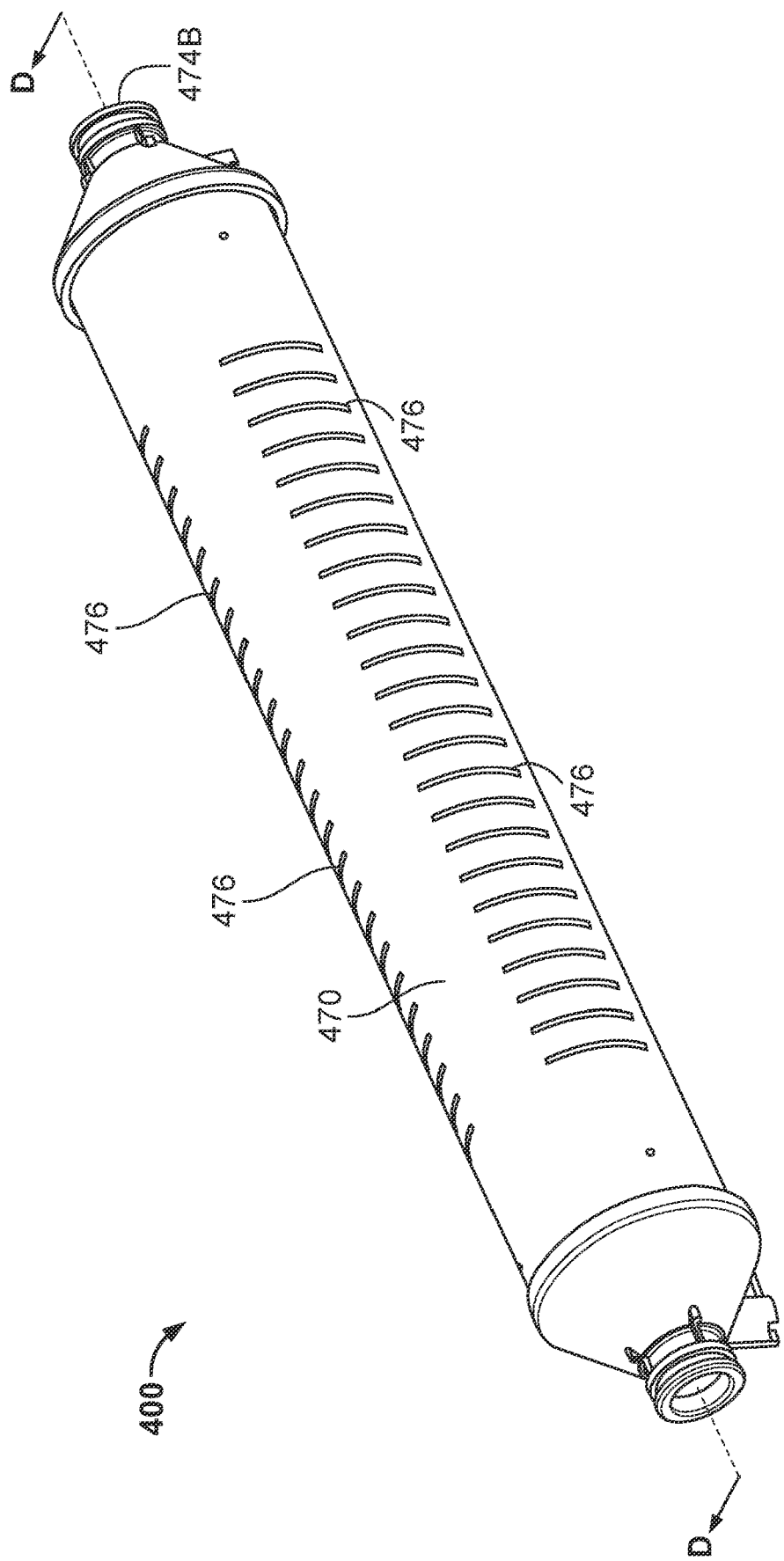
FIG. 15 is an isometric view of a membrane filtration module of the auxiliary filter of FIGS. 10-12.
Figure 16:
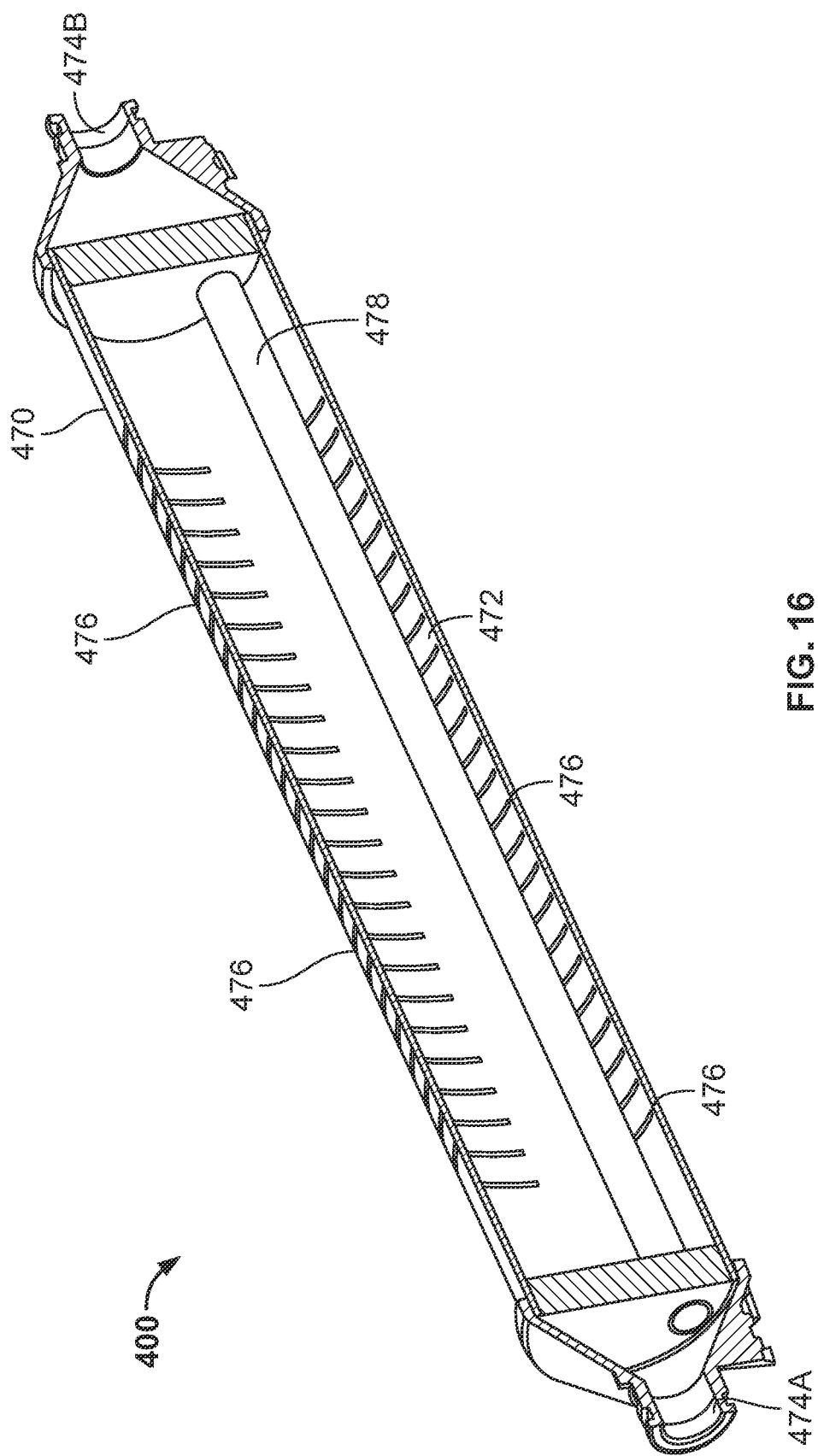
FIG. 16 is a cross-sectional view of the membrane filtration module of FIG. 15 taken along line D-D of FIG. 15.

FIGS. 15 and 16 illustrate the membrane filtration module 400 in more detail. In one embodiment, the filtration module 400 is provided as a high aspect ratio length to width cylinder. The filtration module 400 is provided in the form of a filter housing 470, membrane fibers (not shown), feed openings 474A, 474B, filtrate openings 476, and an integrated flow distribution conduit 478. The membrane fibers can, for example, be arranged around the distribution conduit 478 within the interior of the filter housing 470.

In contrast to the filtrate openings 276 of the membrane filtration module 200, The plurality of filtrate openings 476 are provided in the form of latitudinal apertures with a high width to length aspect ratio, and the filtrate openings 476 are organized into one or more equidistant longitudinal arrays. The integrated flow distribution conduit 478 is provided within the filter housing 470 of the filtration module 400. The flow distribution conduit 478 extends along substantially the entire length of the interior of the filtration module 400, and fluidly connects the feed openings 474A, 474B of the filtration module 400. It is to be understood that the membrane filtration modules 200, 400 can be used interchangeably with either the auxiliary filter 152 or the auxiliary filter 352.

Figure 17:
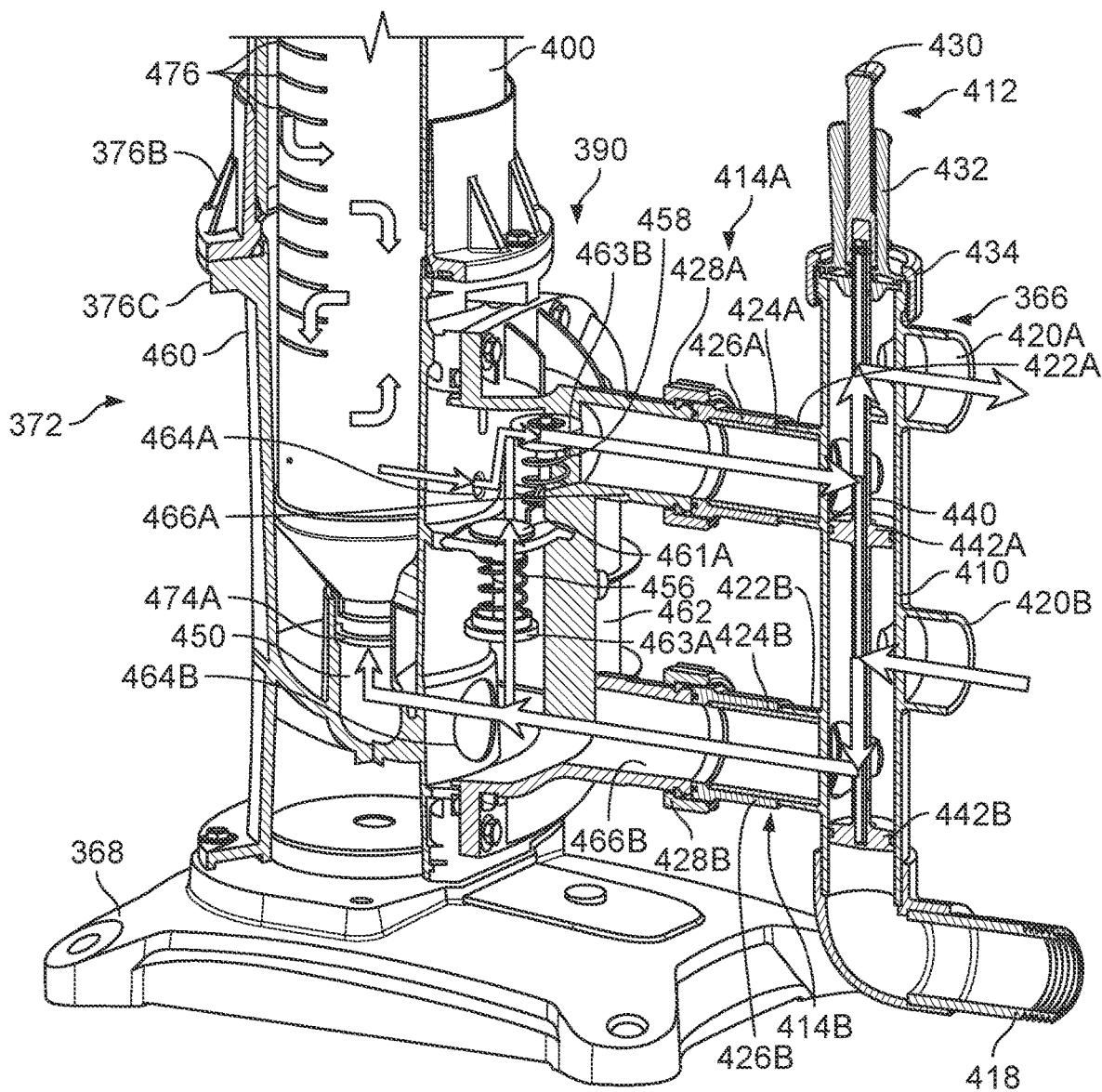
FIG. 17 is a partial isometric view of the auxiliary filter of FIG. 10 with some parts rendered transparently and arrows indicating the flow of water in a first, dead-end filtration mode.
Figure 18:
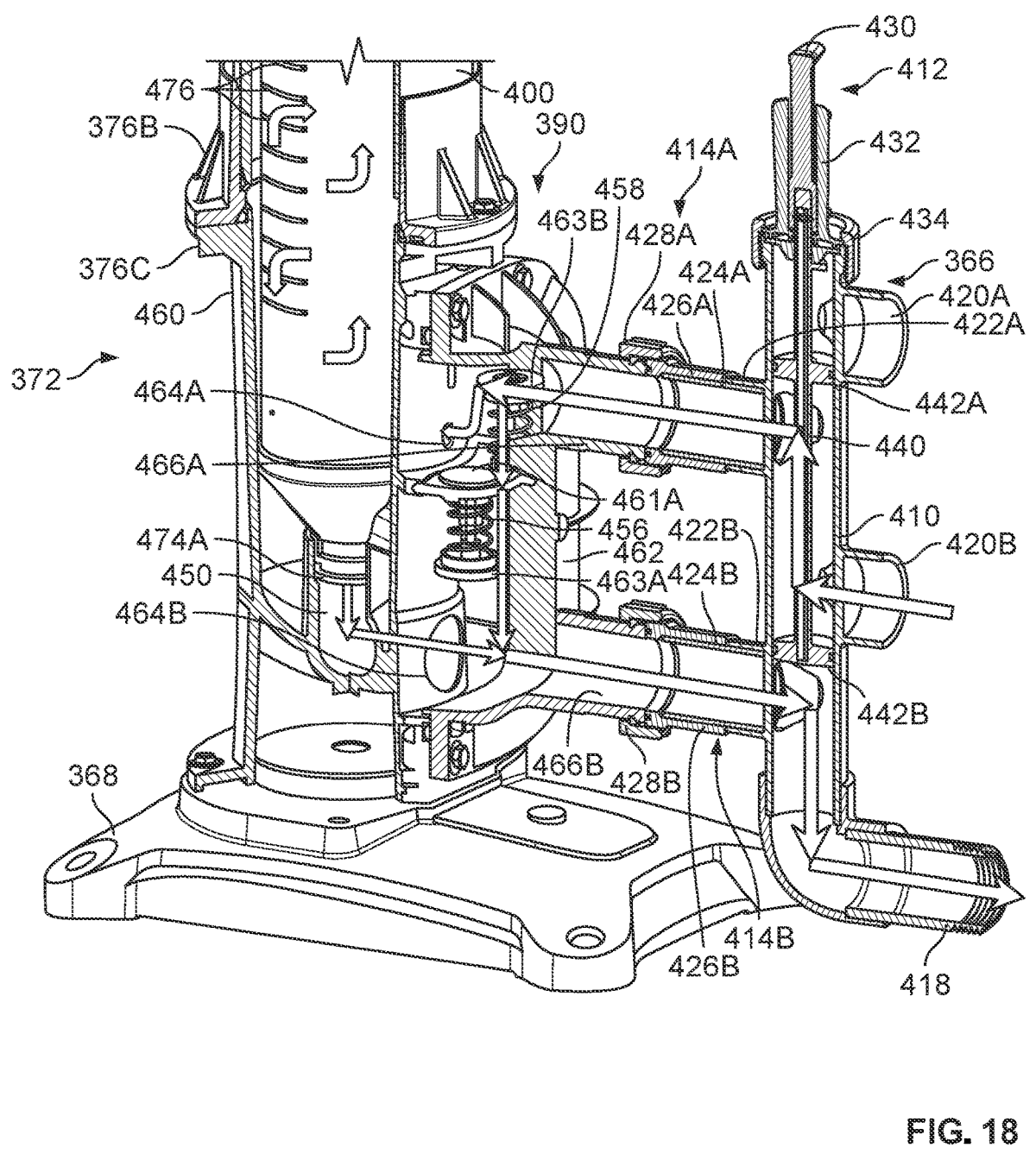

FIGS. 17 and 18 illustrate a fluid flow path and side-stream operation of the auxiliary filter 352 obtained by directing a portion of the influent water flow into the filtration module 400 while the remainder of the water bypasses the filtration module 400 and exits the filtration vessel. The side-stream operation increases practical use of membrane filtration by decreasing the active filtration area from that which would be required if the membrane filtration module 400 were required to accept the full filtration system volumetric flow, based on a nominal flux. FIG. 17 illustrates a first fluid flow configuration through the auxiliary filter 352 when operating in the dead-end filtration mode. In one embodiment, to activate the dead-end filtration mode, the backwash valve push/pull handle 430 is actuated downward, placing the shaft 440 into a lowered resting position. Fluid from a main filter (e.g., primary pool filtration system 154) enters through the influent opening 420B of the valve manifold 410. The disks 442A, 442B of the shaft 440 force the influent fluid within the valve manifold 410 to flow through the lower branch 414B of the conduit system 366 by blocking further downwards flow out of the waste port 418 and blocking upwards fluid flow towards the effluent opening 420A of the valve manifold 410, and the upper branch 414A of the conduit system 366.

Fluid continues to flow from the lower branch 414B through the influent port 466B of the manifold 390. Within the flow distribution manifold 390, a first portion of the fluid flows along a dead-end filtration flow path through the lower flow opening 464B, into the fluid channel 450, and to the membrane filtration module 400. A second portion of the fluid flows along a first bypass flow path through the bypass mechanism 452 via the stem valve 461A based on the fluid properties of the system such as pressure and flow. Accordingly, a portion of the fluid flow is selectively diverted through the stem valve 461A directly to the effluent port 466A. Fluid flowing through the bypass mechanism 452 thus flows upwards through the stem valve 461A, and out of the manifold 390 through the effluent port 466A. Fluid flowing through the fluid channel 450 enters the filtration module 400 through the feed opening 474A of the membrane filtration module 400. Fluid then flows through the membrane fibers of the filtration module 400 to filter the fluid. Once filtered, the fluid flows through the filtrate openings 476 and exits the filtration module 400 through the upper flow opening 464A of the flow distribution manifold 390. The mixed bypass and filtered fluids then flow through the effluent port 466A into the upper branch 414A of the conduit system 366 to the valve manifold 410 and exit the valve manifold 410 through the effluent opening 420A. The disks 442A, 442B of the shaft 440 force the effluent fluid within the upper branch 414A to flow upwards through the valve manifold 410 and out the effluent opening 420A by blocking downwards fluid flow. After exiting the auxiliary filter 352, the filtered fluid is returned to the pool fluid circuit and may be passed to the heater 30, or back to the pool fluid flow circuit. As discussed previously, the fluid may be passed through the primary pool filtration system 154 prior to filtration within the auxiliary filter 352.

FIG. 18 illustrates the fluid flow path through the auxiliary filter 352 when utilizing the backwash mode. In one embodiment, to activate the backwash mode, the backwash valve push/pull handle 430 is pulled upwards, placing the shaft 440 into a raised resting position. Fluid from the primary pool filtration system 154 enters through the influent opening 420B of the valve manifold 410. The disks 442A, 442B of the shaft 440 force the influent fluid within the valve manifold 410 to flow upwards through the upper branch 414A of the conduit system 366 by blocking downwards flow towards the lower branch 414B of the conduit system 366 and the waste port 418 of the valve manifold 410, and further blocking upwards fluid flow toward the effluent opening 420A of the valve manifold 410. Fluid continues to flow from the upper branch 414A through the effluent port 466A of the manifold 390. Within the flow distribution manifold 390, a first portion of the fluid flows along a backwash flow path through the upper flow opening 464A and into the membrane filtration module 400. A second portion of the fluid flows along a second bypass flow path through the bypass mechanism 452 via the stem valve 461B based on the fluid properties of the system such as pressure and flow. Accordingly, a portion of the fluid flow is selectively diverted through the stem valve 461B directly to the influent port 466B. Fluid flowing through the bypass mechanism 452 thus flows downwards through the stem valve 461B and out of the manifold 390 through the influent port 466B.

Fluid flowing into the filtration module 400 enters through the filtrate openings 476. Fluid flows through the membrane fibers in a reverse flow to that of the dead-end filtration mode, resulting in concentrated backwash fluid exiting the filtration module 400 through the bottom feed opening 474A to join the bypass fluid. The mixed bypass and backwash fluids then flow through the influent port 466B into the lower branch 414B of the conduit system 366. From there, fluid flows into the valve manifold 410 downwards and exits the auxiliary filter 352 through the waste port 418. The disks 442A, 442B of the shaft 440 force the effluent fluid within the lower branch 414B to flow downwards through the valve manifold 410 and out the waste port 418 by blocking upwards fluid flow. It is to be understood that the dead-end filtration mode and the backwash mode function in similar ways with similar principles with respect to the auxiliary filter 152 as described above for the auxiliary filter 352. Accordingly, the foregoing description of the dead-end filtration mode and the backwash mode apply analogously to the structures described with respect to the auxiliary filter 152.

It will be appreciated by those skilled in the art that while the above disclosure has been described above in connection with particular embodiments and examples, the above disclosure is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the above disclosure are set forth in the following claims.

The invention claimed is:

1. A pool filtration system for filtering pool water, comprising:
   a pump;
   a primary filter in fluid communication with the pump; and
   an auxiliary filter in fluid communication with the pump and the primary filter, the auxiliary filter comprising:
      a membrane filtration module, and
      a flow distribution manifold provided in the form of a manifold base and a manifold cover and further including an influent port in fluid communication with an influent flow opening and an effluent port in fluid communication with an effluent flow opening, the influent flow opening and the effluent flow opening fluidly coupled across the membrane filtration module,
      the flow distribution manifold further including a bypass mechanism coupled between the manifold base and the manifold cover, the bypass mechanism including at least one valve that selectively fluidly couples the influent port to the effluent port to bypass the membrane filtration module.

2. The pool filtration system of claim 1, including a first pressure port extending into the flow distribution manifold on a first side of the effluent flow opening and a second pressure port extending into the flow distribution manifold on a second side of the effluent flow opening, and
a differential pressure gauge coupled to the first pressure port and the second pressure port to measure a differential pressure value.

3. The pool filtration system of claim 1, wherein the at least one valve includes a first stem valve with a first spring, the first stem valve selectively allowing one-way flow from the influent port to the effluent port.

4. The pool filtration system of claim 1, wherein the at least one valve includes a first stem valve with a first spring and a second stem valve with a second spring, the first stem valve selectively allowing one-way flow from the influent port to the effluent port and the second stem valve selectively allowing one-way flow from the effluent port to the influent port.

5. The pool filtration system of claim 4, wherein the first spring has a first stiffness value and the second spring has a second stiffness value different from the first stiffness value.

6. The pool filtration system of claim 1, wherein the influent flow opening has a first diameter and the effluent flow opening has a second diameter, the second diameter being smaller than the first diameter.

7. The pool filtration system of claim 6, wherein the second diameter is less than ¼ the size of the first diameter.

8. The pool filtration system of claim 1, wherein the membrane filtration module is sized and shaped as an elongate cylinder and includes a plurality of latitudinal filtrate openings arranged into one or more equidistant longitudinal arrays.

9. The pool filtration system of claim 1, wherein the membrane filtration module houses a plurality of membrane fibers, the membrane fibers consisting of asymmetric hollow fibers.

10. The pool filtration system of claim 1, wherein the primary filter is one of a diatomaceous earth filter, pressure-fed sand filter, gravity sand filter, or a cartridge filter.

11. A pool filtration system for filtering pool water, comprising:
a pump;
a primary filter in fluid communication with the pump; and
an auxiliary filter in fluid communication with the pump and the primary filter, the auxiliary filter comprising:
a membrane filtration module, and
a flow distribution manifold provided in the form of a manifold base and a manifold cover and further including an influent port in fluid communication with an influent flow opening and an effluent port in fluid communication with an effluent flow opening, the membrane filtration module fluidly coupling the influent flow opening and the effluent flow opening along a first flow path,
the flow distribution manifold further including a bypass mechanism coupled between the manifold base and the manifold cover, the bypass mechanism including a first valve and a second valve that selectively fluidly couple the influent port and the effluent port along a second flow path to bypass the membrane filtration module.

12. The pool filtration system of claim 11, wherein the first valve is a first stem valve having a first spring, the second valve is a second stem valve having a second spring, and the bypass mechanism includes a bypass base plate to which the first stem valve and the second stem valve are coupled.

13. The pool filtration system of claim 12, wherein the first stem valve extends from a first side of the bypass base plate adjacent the influent port and the second stem valve extends from a second side of the bypass base plate adjacent the effluent port.

14. The pool filtration system of claim 12, wherein the bypass base plate includes a first side with a first groove corresponding to the first spring and a second side with a second groove corresponding to the second spring.

15. A pool filtration system for filtering pool water, comprising:
a pump;
a primary filter in fluid communication with the pump; and
an auxiliary filter in fluid communication with the pump and the primary filter, the auxiliary filter including a membrane filtration module, a flow distribution manifold, and a vertical valve manifold, the flow distribution manifold including:
a manifold base and a manifold cover,
an influent port fluidly coupled to a first end of the membrane filtration module,
an effluent port fluidly coupled to a second end of the membrane filtration module, and
a bypass mechanism coupled between the manifold base and the manifold cover including at least one valve that selectively fluidly couples the influent port and the effluent port to bypass the membrane filtration module,
the vertical valve manifold including an influent opening, an effluent opening, a drain pipe, a first branch port fluidly coupled to the effluent port of the flow distribution manifold, and a second branch port fluidly coupled to the influent port of the flow distribution manifold, wherein the vertical valve manifold includes a shaft with plurality of disks, the shaft being movable between a first position and a second position,
wherein the influent port is in fluid communication with the influent opening, the effluent port is in fluid communication with the effluent opening, and the influent opening and the effluent opening are fluidly coupled across the membrane filtration module.

16. The pool filtration system of claim 15, wherein when the shaft is in the first position, pool water is directed through the membrane filtration module in a first direction, and when the shaft is in the second position, pool water is directed through the membrane filtration module in a second direction.

17. The pool filtration system of claim 15, wherein when the shaft is in the first position, the influent opening and the effluent opening are in fluid communication and in the second position, the influent opening and the drain pipe are in fluid communication.

18. The pool filtration system of claim 15, wherein the at least one valve includes a first valve and a second valve, wherein the first valve is actuatable when the shaft is in the first position, and the second valve is actuatable when the shaft is in the second position.

19. The pool filtration system of claim 15, wherein the influent port, the effluent port, and the membrane filtration module are fluidly coupled along a first fluid flow path, and the influent port, the effluent port, and the bypass mechanism are selectively fluidly coupled along a second fluid flow path, and when the shaft is in the first position, pool water is directed along the first fluid flow path and the second fluid flow path in a first direction, and when the shaft is in the second position, pool water is directed along the first fluid flow path and the second fluid flow path in a second direction opposite the first direction.

20. The pool filtration system of claim 19, wherein the at least one valve includes a first valve and a second valve, and wherein pool water is directed along the second fluid flow path in the first direction through the first valve and pool water is directed along the second fluid flow path in the second direction through the second valve.

\* \* \* \* \*